United States Patent
Kraz et al.

(10) Patent No.: US 11,371,545 B2
(45) Date of Patent: Jun. 28, 2022

(54) ADJUSTABLE-ANGLE MOUNTING SYSTEM FOR HAZARD DETECTOR

(71) Applicant: Google LLC, Mountain View, CA (US)

(72) Inventors: Mark Kraz, Santa Clara, CA (US); Adam Mittleman, Redwood City, CA (US)

(73) Assignee: Google LLC, Mountain View, CA (US)

( * ) Notice: Subject to any disclaimer, the term of this patent is extended or adjusted under 35 U.S.C. 154(b) by 675 days.

(21) Appl. No.: 16/266,991

(22) Filed: Feb. 4, 2019

(65) Prior Publication Data

US 2019/0172332 A1 Jun. 6, 2019

Related U.S. Application Data

(63) Continuation of application No. 14/716,613, filed on May 19, 2015, now Pat. No. 10,242,545.

(51) Int. Cl.
*F16B 21/02* (2006.01)
*G08B 17/113* (2006.01)

(52) U.S. Cl.
CPC ............ *F16B 21/02* (2013.01); *G08B 17/113* (2013.01); *Y10T 403/7005* (2015.01)

(58) Field of Classification Search
CPC ...... F16B 5/0056; F16B 5/008; F16B 5/0084; F16B 5/0092; F16B 5/07; F16B 21/02; Y10T 403/1624; Y10T 403/32213; Y10T 403/7005; Y10T 403/7009; Y10T 403/7015; G08B 17/113; G08B 17/00
USPC ......................... 340/391.1, 396.1, 549, 693.9
See application file for complete search history.

(56) References Cited

U.S. PATENT DOCUMENTS

| | | | |
|---|---|---|---|
| 4,139,770 A * | 2/1979 | Beyersdorf | G08B 17/113 250/381 |
| 5,568,133 A | 10/1996 | Durrer et al. | |
| 5,578,996 A * | 11/1996 | Watson | G08B 29/181 200/300 |
| 5,710,541 A * | 1/1998 | Stanley | G08B 17/113 340/628 |
| 5,808,556 A | 9/1998 | Nelson et al. | |
| 6,160,487 A | 12/2000 | DeLuca | |

(Continued)

OTHER PUBLICATIONS

Parker 0-Ring Handbook, ORD 5700, Parker Hannifin Corporation, 2007, www.parker.com/literature/ORing%20Division%20Literature/ORD%205700%20Parker_O-Ring_Handbook.pdf, all pages.

*Primary Examiner* — Josh Skroupa
*Assistant Examiner* — Kevin J Baynes
(74) *Attorney, Agent, or Firm* — Kilpatrick Townsend & Stockton LLP

(57) ABSTRACT

Various arrangements of a surface mount system are presented herein. The system may include a surface mount plate. The surface mount plate may include a circular lip and nubs located along the circular lip. The system may also include a device housing. The device housing can include slider clips that removably clip to the circular lip of the surface mount plate when the plurality of slider clips are pushed against the circular lip. The slider clips can be disengaged from the circular lip of the surface mount plate when the device housing is rotated with respect to the surface mount plate such that the nubs located on the surface mount plate push the slider clips away from the circular lip.

20 Claims, 18 Drawing Sheets

(56) References Cited

U.S. PATENT DOCUMENTS

| | | | |
|---|---|---|---|
| 6,181,251 B1* | 1/2001 | Kelly | G08B 7/062 |
| | | | 340/628 |
| 6,268,882 B1 | 7/2001 | Elberbaum | |
| 6,522,254 B1* | 2/2003 | Yamano | G08B 17/107 |
| | | | 250/574 |
| 6,731,222 B2 | 5/2004 | Martineau | |
| 7,109,874 B2 | 9/2006 | Pilkington | |
| 7,123,158 B2 | 10/2006 | DeLuca et al. | |
| 7,553,044 B2* | 6/2009 | Wedell | F21V 5/045 |
| | | | 362/240 |
| 7,940,167 B2 | 5/2011 | Steiner et al. | |
| 7,990,468 B2 | 8/2011 | Yamamoto | |
| 8,125,320 B2 | 2/2012 | Yamano | |
| 8,847,772 B2 | 9/2014 | Marks et al. | |
| 8,910,820 B2 | 12/2014 | Sharpe | |
| 10,242,545 B2 | 3/2019 | Kraz et al. | |
| 2005/0088311 A1* | 4/2005 | Deluca | G08B 17/113 |
| | | | 340/693.9 |
| 2006/0017580 A1* | 1/2006 | Hess | G08B 17/107 |
| | | | 340/630 |
| 2007/0126872 A1* | 6/2007 | Bolotine | H04N 5/2252 |
| | | | 348/151 |
| 2010/0073172 A1 | 3/2010 | Lax | |
| 2011/0139965 A1* | 6/2011 | Sloan | G01J 1/4204 |
| | | | 250/2 UAL |
| 2015/0097679 A1 | 4/2015 | Andrews et al. | |
| 2015/0111404 A1* | 4/2015 | Seiler | G08B 17/113 |
| | | | 29/747 |
| 2015/0130621 A1* | 5/2015 | Seiler | H01M 50/20 |
| | | | 340/628 |

* cited by examiner

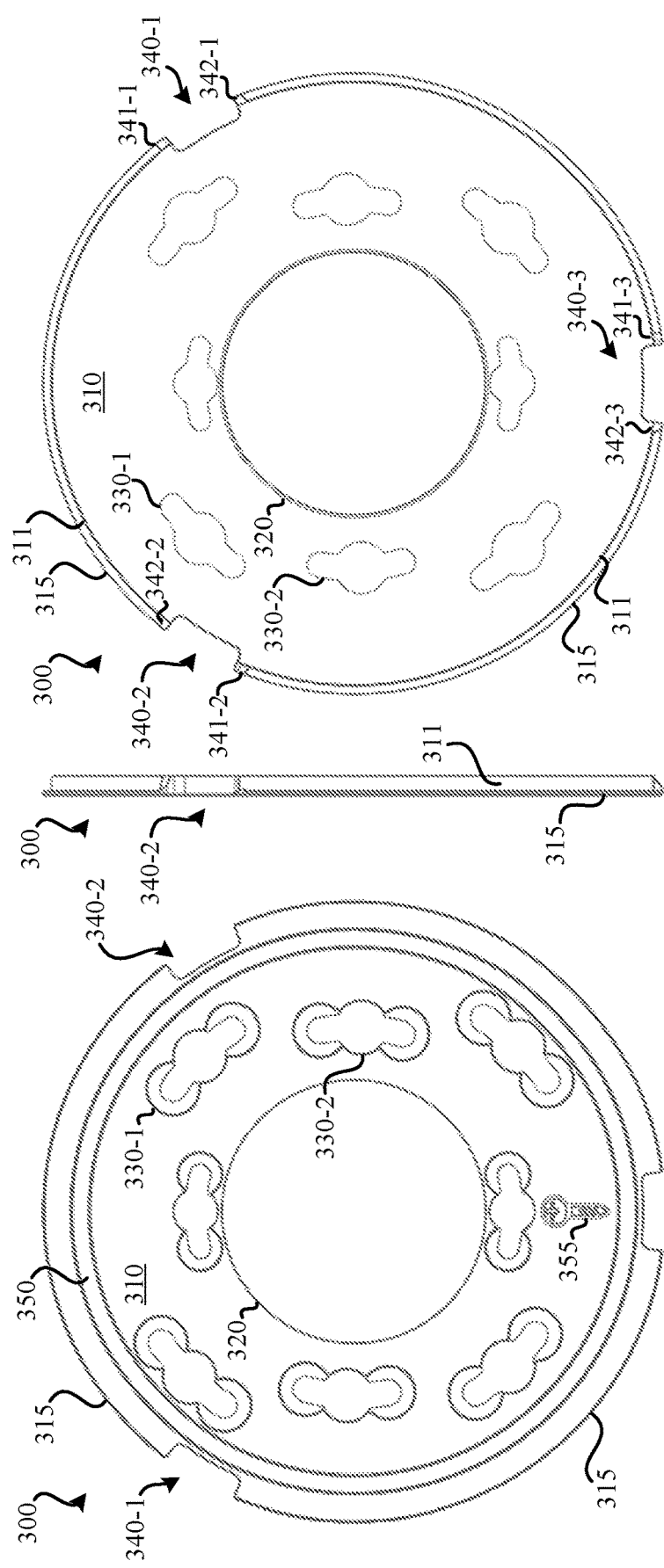
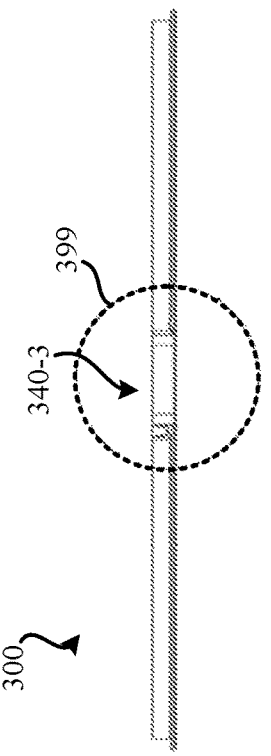
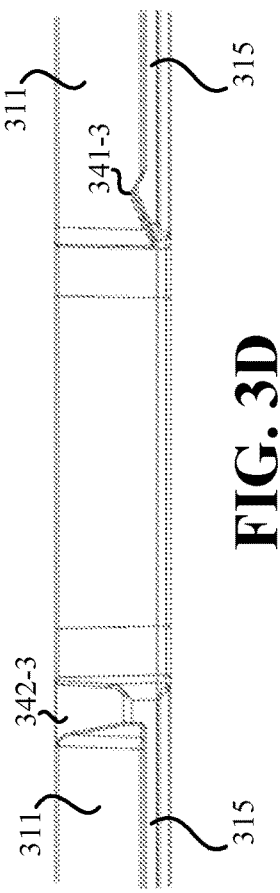
FIG. 3A
FIG. 3B
FIG. 3C
FIG. 3D
FIG. 3E

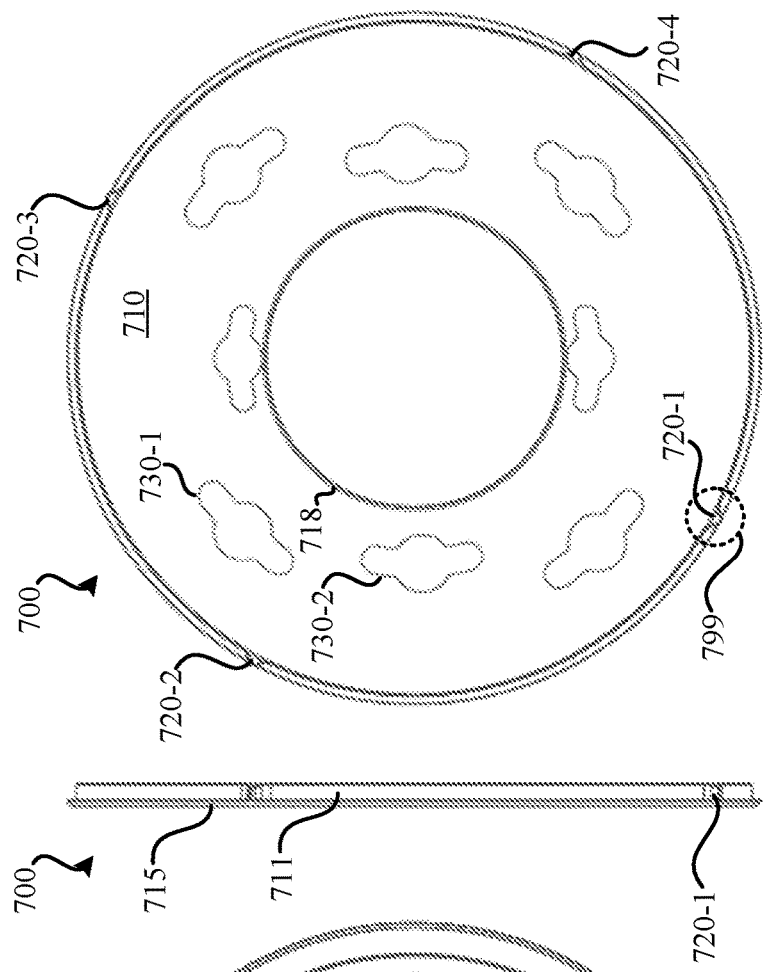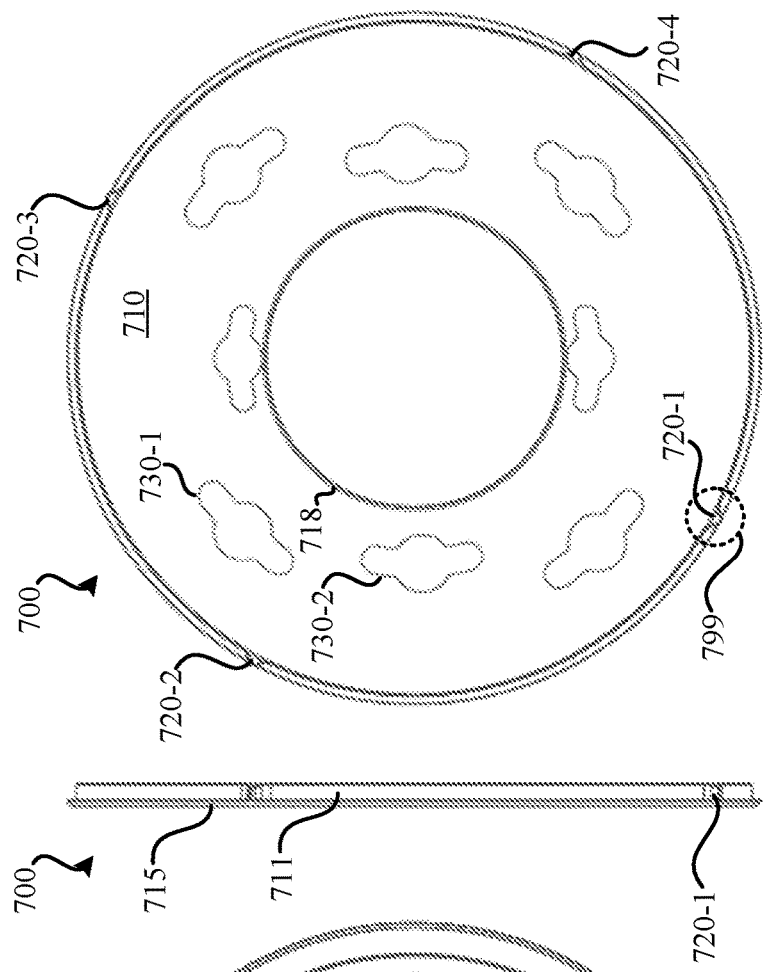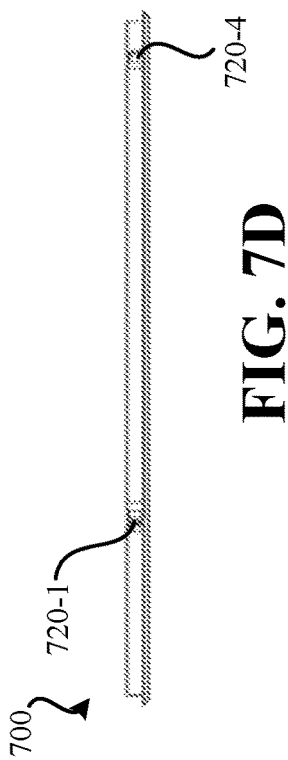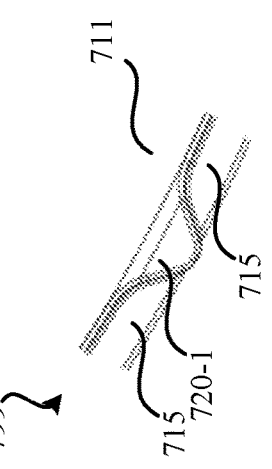

ADJUSTABLE-ANGLE MOUNTING SYSTEM FOR HAZARD DETECTOR

CROSS-REFERENCES TO RELATED APPLICATIONS

This application is a continuation of U.S. patent application Ser. No. 14/716,613, filed May 19, 2015, the entire disclosure of which is incorporated by reference herein for all purposes.

BACKGROUND

In a structure, such as a house, various sensors may be mounted to the walls and ceilings. For example, carbon monoxide detectors and smoke detectors are two common types of sensors that are ubiquitous in households, offices, and other locations. While such sensors serve important safety functions, occupants of the structure also want to be surrounded by visually pleasing devices. If a sensor is circular, it may matter little to the occupants what the angular orientation of the sensor is in relation to other objects and/or portions of the structure itself (e.g., edges of the wall or ceiling). However, if the sensor is non-circular, the orientation of the sensor in relation to other objects and/or portions of the structure itself may be glaringly apparent. Using conventional mounting arrangements, it may be exceedingly difficult for a user to mount a sensor in a particular rotational orientation in relation to other objects and/or portions of the structure itself.

SUMMARY

In some embodiments, a surface mount system is presented. The surface mount system may include a surface mount plate that includes a plate having a plurality of attachment mounting points that allow a plurality of fasteners to secure the surface mount plate to a surface such that the surface mount plate is mounted in a fixed position in relation to the surface. The surface mount plate may include a circular lip extending around at least a first portion of the plate, the circular lip having a plurality of distributed lip gaps. The system may include a sensor housing that includes a plurality of sliders that removably couple with the circular lip of the surface mount plate when the plurality of sliders are aligned and inserted into the plurality of distributed lip gaps of the circular lip and the sensor housing is rotated. The plurality of sliders may slide along the circular lip to allow the sensor housing to be rotated in relation to the surface mount plate while the sensor housing remains coupled with the surface mount plate.

Embodiments of such a surface mount system may include one or more of the following: The surface mount plate may include a compressible ring. The compressible ring may be positioned on the surface mount plate such that, when the sensor housing is coupled with the surface mount plate and the sensor housing is rotated, the compressible ring is at least partially compressed and creates friction between the surface mount plate and the sensor housing. At least 0.40 Newton-meters of static friction may be present between the compressible ring and the sensor housing. The compressible ring, when the sensor housing is coupled with the surface mount plate, may substantially prevent air from passing between the surface mount plate and the sensor housing. The plurality of distributed lip gaps of the surface mount plate and the plurality of sliders of the sensor housing may be distributed such that the sensor housing can be rotated at least 65 degrees in relation to the surface mount plate while the sensor housing is coupled with the circular lip of the surface mount plate. The plurality of sliders that slide along the circular lip of the surface mount plate may provide for non-indexed rotation of the sensor housing in relation to the surface mount plate, whereby a user can set any orientation of the sensor housing in relation to the surface mount plate by rotating the sensor housing while the sensor housing is coupled with the surface mount plate. The sensor housing may further include a circular depressed lip within which the plurality of sliders are located. The circular lip of the surface mount plate may seat within the circular depressed lip to permit rotation for aligning the plurality of distributed lip gaps with the plurality of sliders. The surface mount plate may include a feedback nub located on the circular lip adjacent to a distributed lip gap of the plurality of distributed lip gaps, the feedback nub causing tactile feedback when a slider of the plurality of sliders passes over the feedback nub. The surface mount plate may be circular and the sensor housing is rectangular.

In some embodiments, a method for using a surface mount system to align a sensor device may be presented. The method may include mounting a surface mount plate in a fixed position on a surface using a plurality of fasteners mounted through a plurality of attachment mounting points of the surface mount plate. The surface mount plate may include a circular lip having a plurality of distributed lip gaps. The sensor device may include a sensor housing and the surface mount plate. The method may include mounting occurs while the surface mount plate is detached from the sensor housing. The method may include aligning a plurality of sliders of the sensor housing with a plurality of distributed gaps of the circular lip of the surface mount plate. The method may include rotating the sensor housing in relation to the surface mount plate such that the plurality of sliders slide along the circular lip of the surface mount plate in non-indexed movement. The method may include ceasing rotation of the sensor housing while the plurality of sliders are sliding along the circular lip of the surface mount plate in non-indexed movement at a position such that an edge of the sensor housing is parallel to an edge of an external object distinct from the sensor device. The method may include maintaining the position of the sensor housing relative to the surface mount plate following rotation of the sensor housing being ceased.

Embodiments of such methods may include one or more of the following features: The method may include, prior to aligning the plurality of sliders of the sensor housing with the plurality of distributed gaps of the circular lip of the surface mount plate, connecting the sensor housing with one or more external wires that pass through the surface mount plate. Maintaining position of the sensor housing relative to the surface mount plate following rotation of the sensor housing being ceased may include counteracting a rotational force applied by the one or more external wires to the sensor housing using friction between a compressible ring located between the sensor housing and the surface mount plate. The method may include, while rotating the sensor housing in relation to the surface mount plate, signaling, to a user, via tactile feedback, that the sensor housing is fully coupled with the surface mount plate, wherein rotation of the sensor housing continues following the tactile feedback until the user ceases the rotation of the sensor housing such that the edge of the sensor housing is parallel to the edge of the external object.

In some embodiments, a surface mount system is presented. The surface mount system may include a plate having a plurality of attachment mounting points that allow a plurality of fasteners to secure the surface mount plate to a surface such that the surface mount plate is mounted in a fixed position in relation to the surface. The plate may include a perimeter lip extending around at least a first portion of the surface mount plate. The plate may include a plurality of protuberant nubs. The system may include a sensor housing that includes a plurality of attachment mechanisms that removably couple with the circular lip of the surface mount plate by the sensor housing being pushed against the surface mount plate. The plurality of attachment mechanisms may slide along the circular lip to allow the sensor housing to be rotated in relation to the surface mount plate while the sensor housing remains coupled with the surface mount plate. The plurality of attachment mechanisms may at least partially disengage from the circular lip when the sensor housing is rotated in relation to surface mount plate such that the plurality of attachment mechanisms are actuated by the plurality of protuberant nubs.

Embodiments of such a surface mount system may include one or more of the following features: The surface mount plate may include a compressible ring. The compressible ring may be positioned on the surface mount plate such that when the sensor housing is coupled with the surface mount plate and the sensor housing is rotated, the compressible ring may be at least partially compressed and creates friction between the surface mount plate and the sensor housing. The compressible ring, when the sensor housing is coupled with the surface mount plate, may substantially prevents air from passing between the surface mount plate and the sensor housing. The plurality of protuberant nubs of the surface mount plate and the plurality of attachment mechanisms of the sensor housing may be distributed such that while the sensor housing is coupled with the circular lip of the surface mount plate, the sensor housing can be rotated at least 65 degrees without the plurality of protuberant nubs at least partially disengaging the plurality of attachment mechanisms. The plurality of attachment mechanisms sliding along the circular lip of the surface mount plate may provide non-indexed of the sensor housing in relation to the surface mount plate. The surface mount plate may be circular and, when mounted to a surface and coupled with the sensor housing, is not visible. The surface mount plate may further comprises an indented edge extending around at least a second portion of the surface mount plate, the perimeter lip having a greater perimeter than the indented edge. The plurality of protuberant nubs may extend from the indented edge of the surface mount plate. Each attachment mechanism of the plurality of attachment mechanisms may be selected from the group consisting of: a snap and a magnet. A surface of the sensor housing may face away from the surface mount plate when the sensor housing is coupled with the surface mount plate is rectangular. The plurality of attachment mechanisms may include at least four attachment mechanisms and the plurality of protuberant nubs may include at least four protuberant nubs. The sensor housing may house at least one sensor, the at least one sensor selected from the group consisting of: a carbon monoxide sensor and a smoke sensor.

In some embodiments, a method for mounting a sensor housing using a surface mount system is presented. The method may include attaching a surface mount plate of the surface mount system to a surface using a plurality of fasteners such that the surface mount plate is mounted in a fixed position in relation to the surface. The method may include pushing the sensor housing against the mounted surface mount plate causing a plurality of attachment mechanisms to couple with a circular lip of the surface mount plate. The method may include rotating the sensor housing in relation to the surface mount plate using non-indexed rotation while the plurality of attachment mechanisms are coupled with the circular lip on the surface mount plate, wherein rotation is ceased at a non-indexed, user-desired position.

Embodiments of such a method may include one or more of the following features: The method may include rotating the sensor housing in relation to the surface mount plate until the plurality of attachment mechanisms of the sensor housing are actuated by a plurality of protuberant nubs of the surface mount plate. The method may include pulling the sensor housing away from the surface mount plate while the plurality of attachment mechanisms of the sensor housing are actuated by the plurality of protuberant nubs of the surface mount plate. Pushing the sensor housing against the mounted surface mount plate may cause a compressible ring to become compressed between the surface mounting plate and the sensor housing. The method may include rotating the sensor housing in relation to the surface mount plate using non-indexed rotation comprises the sensor housing being rotated at least 45 degrees prior to the plurality of attachment mechanisms of the sensor housing being actuated by the plurality of protuberant nubs of the surface mount plate. Attaching the surface mount plate of the surface mount system to the surface using the plurality of fasteners may include attaching the surface mount plate to a ceiling using a plurality of screws mounted through a plurality of radially distributed mounting points of the surface mount plate.

In some embodiments, a surface mount apparatus is presented. The apparatus may include a surface mount means that includes mounting means that allow a plurality of fasteners to secure the surface mount means to a surface such that the surface mount means is mounted in a fixed position in relation to the surface. The surface mount means may include protruding means extending around at least a first portion of the surface mount means. The apparatus may include attachment mechanism disengagement means. The apparatus may include a sensor housing means that includes include attachment means that removably couple with the protruding means of the surface mount means by the sensor housing means being pushed against the surface mount means. The attachment means may slide along the protruding means to allow the sensor housing means to be rotated in relation to the surface mount means while the sensor housing remains coupled with the surface mount means. The attachment means may at least partially disengage from the protruding means when the sensor housing means is rotated in relation to surface mount means such that the attachment means are actuated by the attachment mechanism disengagement means. In some embodiments of the apparatus, a compressible ring means may be present that is compressed between the sensor housing means and the surface mount means when the sensor housing means is coupled with the surface mount means.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A, 3B, 3C, 3D, and 3E illustrate an embodiment of a surface mount plate of a surface mount system viewed from various angles.

FIGS. 7A, 7B, 7C, 7D, and 7E illustrates an embodiment of a surface mount plate of a surface mount system viewed from various angles.

DETAILED DESCRIPTION

Figure 1A:
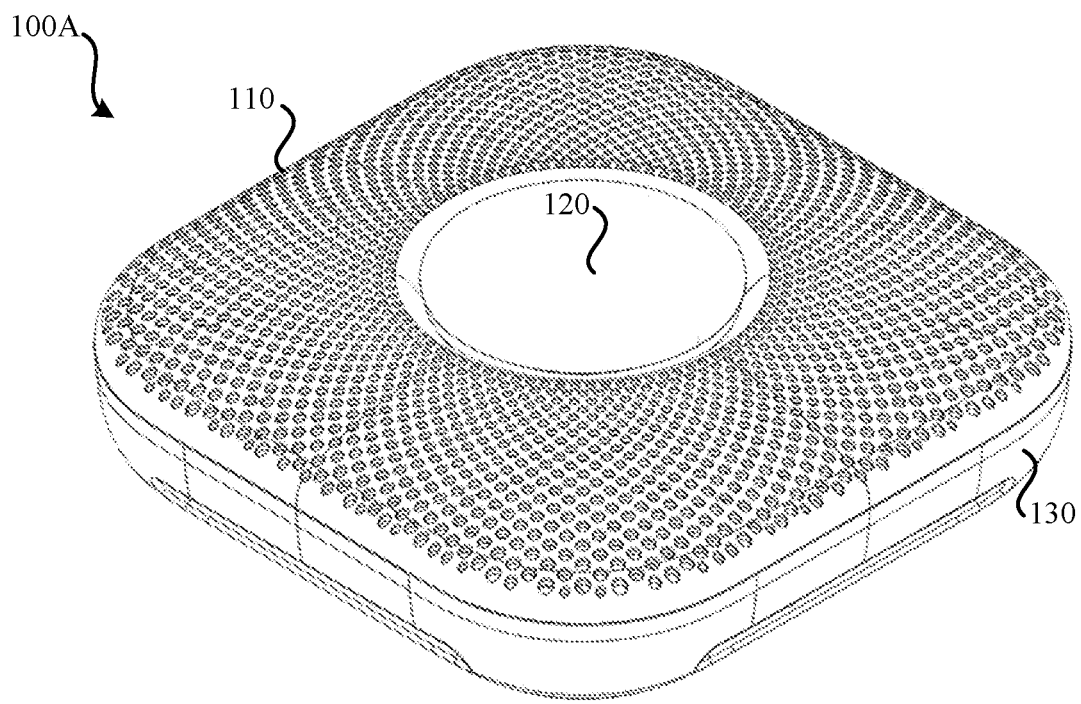
FIGS. 1A and 1B illustrate an embodiment of a smart combined smoke detector and carbon monoxide device.

A surface mount system is presented that allows a device (such as a sensor) to be rotated while remaining fully engaged with a mounting plate, thus allowing an installer (a user installing or otherwise positioning the device) to select a desired rotational position of the device in relation to the mounting plate. By allowing the device to be rotated while being fully engaged with the mounting plate, the user can rotate the device to a visually-pleasing position and leave the device in such an orientation. For instance, if a rectangular sensor is being mounted to a ceiling, it may be desired for an edge of the sensor to be parallel to the edge of the ceiling. Similarly, if a rectangular sensor is being mounted to a wall, it may be desired for a top edge of the sensor to be level such that the top edge is parallel to the floor and ceiling. An advantage of such a design is that a surface mount plate can be attached to a surface by fasteners (e.g., screws or nails) with little regard for orientation of the surface mount plate. Once the housing of the device is coupled with the surface mount plate, the device's housing can be rotated to the desired rotational orientation. Such arrangements can help eliminate the need for adjusting the orientation of the surface mount plate.

In various embodiments detailed herein, a surface mount plate is provided. The surface mount plate has multiple mounting holes, which may be designed to receive fasteners. Such holes allow for fasteners to be used to mount the surface mount plate to a surface. An orientation of the surface mount plate with relation to the surface may not be critical since the device to be attached with the surface mount plate can be rotated after being coupled with the surface mount plate.

A housing of a device that is to be attached to the surface mount plate, such as a sensor housing of a sensor, may be coupled with the surface mount plate. For example, the device may be a smoke detector, carbon monoxide detector, or combination device that contains both a smoke detector and carbon monoxide detector. Other types of sensors are also possible, such as humidity sensors, sound sensors, video or still cameras, temperature sensors, etc. In some embodiments, the surface mount plate has a circular lip. The circular lip can have gaps distributed at regular intervals. The sensor housing may have attachment mechanisms (which can be referred to as sliders) that are distributed in a mirrored pattern to the gaps of the surface mount plate. The attachment mechanisms can be aligned with the gaps such that the attachment mechanisms couple with the circular lip when the sensor housing is rotated in relation to the surface mount plate. Once the attachment mechanisms have coupled with the circular lip, the attachment mechanisms may slide along the circular lip, thus allowing the sensor housing to be rotated in relation to the surface mount plate. Such rotation may be non-indexed—meaning that, throughout the angle or range of permitted rotation, there are not particular predefined locations at which the sensor housing must be oriented in relation to the surface mount plate. A user may leave the sensor housing at a desired orientation relative to the surface mount plate (and the surface to which the surface mount plate is fixed). To detach the sensor housing from the surface mount plate, the sensor housing may be rotated until the attachment mechanisms again align with the distributed gaps. When aligned, the attachment mechanisms are decoupled from the circular lip, thus allowing the sensor housing to be pulled away from the surface mount plate. A compressible ring, such as made out of foam, located between the surface mount plate and the sensor housing, may serve multiple purposes: first, to decrease an amount of airflow between the surface mount plate and the sensor housing; and second, to provide friction between the surface mount plate and the sensor housing. Such friction can help maintain an orientation of the surface mount plate and the sensor housing despite the potential of other forces acting on the sensor housing, such as vibration or force exerted by external wires coupled with the sensor.

In other embodiments, the surface mount plate may also a circular lip. However, along the circular lip, various nubs may protrude from the body of the surface mount plate. The sensor housing may have attachment mechanisms, such as slider clips, that are distributed in a circular pattern. The attachment mechanisms can be coupled with the circular lip by pushing the sensor housing against the surface mount plate. Such a push causes the attachment mechanisms to couple with (e.g., clip to) the circular lip. Once the attachment mechanisms have coupled with the circular lip, the attachment mechanisms may slide along the circular lip when a user rotates the sensor housing. Such an arrangement allows the sensor housing to be rotated in relation to the surface mount plate while the sensor housing remains fully coupled with the surface mount plate. Such rotation may be non-indexed—meaning that, throughout the angle of rotation permitted, there are not particular predefined locations at which the sensor housing must be oriented in relation to the surface mount plate. To detach the sensor housing from the surface mount plate, the sensor housing can be rotated (possibly in either direction) until the attachment mechanisms encounter the nubs distributed along the circular lip. The nubs, by virtue of rotational force supplied to the sensor housing by a user, simultaneously either fully or partially actuate the attachment mechanisms, allowing the sensor housing to be decoupled from the surface mount plate by pulling the sensor housing away from the surface mount plate. Similar to the previously detailed embodiments, rotation while the plate and the housing are coupled may be non-indexed, allowing a user to orient the sensor housing in a desired orientation to the surface mount plate and the surface to which the surface mount plate is fixed. Again, here, a compressible ring, which may be made of foam, may serve multiple purposes: first, to decrease an amount of airflow between the surface mount plate and the sensor housing; and second, to provide friction between the surface mount plate and the sensor housing.

The following description focuses on the applications of various surface mount systems to sensors. It should be understood that such surface mount systems may be used for other purposes besides attaching a sensor device to a surface.

Various embodiments of smoke chambers, including the above aspects and aspects yet to be noted, are described in detail in relation to the figures that follow. For overall understanding, a big picture view of a device that uses such a smoke chamber is first described. Such a device may be a dedicated smoke detector or a combination device, such as carbon-monoxide detector and smoke detector. FIG. 1A illustrates an embodiment of a smart combined smoke detector and carbon monoxide device 100A. Such an embodiment of a smart combined smoke detector and carbon monoxide device 100A may be suitable for mounting to a wall or ceiling in a room (or other location) within a structure in which smoke and/or carbon monoxide is to be monitored. Device 100A may be "smart," meaning the device 100A can communicate, likely wirelessly, with one or more other devices or networks. For instance, device 100A may communicate with a remote server via the Internet and, possibly, a home wireless network (e.g., an IEEE 802.11a/b/g network, 802.15 network, such as using the Zigbee® or Z-Wave® specification). Such a smart device may allow for a user to interact with the device via wireless communication, either via a direct or network connection between a computerized device (e.g., cellular phone, tablet computer, laptop computer, or desktop computer) and the smart device.

FIG. 1A illustrates an angular top projection view of combined smoke detector and carbon monoxide device 100A. Device 100A may generally be square or rectangular and have rounded corners. Visible in the angular top projection view are various components of the combined smoke detector and carbon monoxide device 100A, including: cover grille 110, lens/button 120, and enclosure 130 (also referred to as sensor housing 130). Cover grille 110 may serve to allow air to enter combined smoke detector and carbon monoxide device 100A through many holes while giving device 100A a pleasing aesthetic appearance. Cover grille 110 may further serve to reflect light into the external environment of device 100A from internal light sources (e.g., LEDs). Light may be routed internally to cover grille 110 by a light pipe, noted in relation to FIGS. 2A and 2C. It should be understood that the arrangement of holes and shape of cover grille 110 may be varied by embodiment. Lens/button 120 may serve multiple purposes. First, lens/button 120 may function as a lens, such as a Fresnel lens, for use by a sensor, such as an infrared (IR) sensor, located within device 100A behind lens/button 120 for viewing the external environment of device 100A. Additionally, lens/button 120 may be actuated by a user by pushing lens/button 120. Such actuation may serve as user input to device 100A. Enclosure 130 may serve as a housing for at least some of the components of device 100A.

Figure 1B:
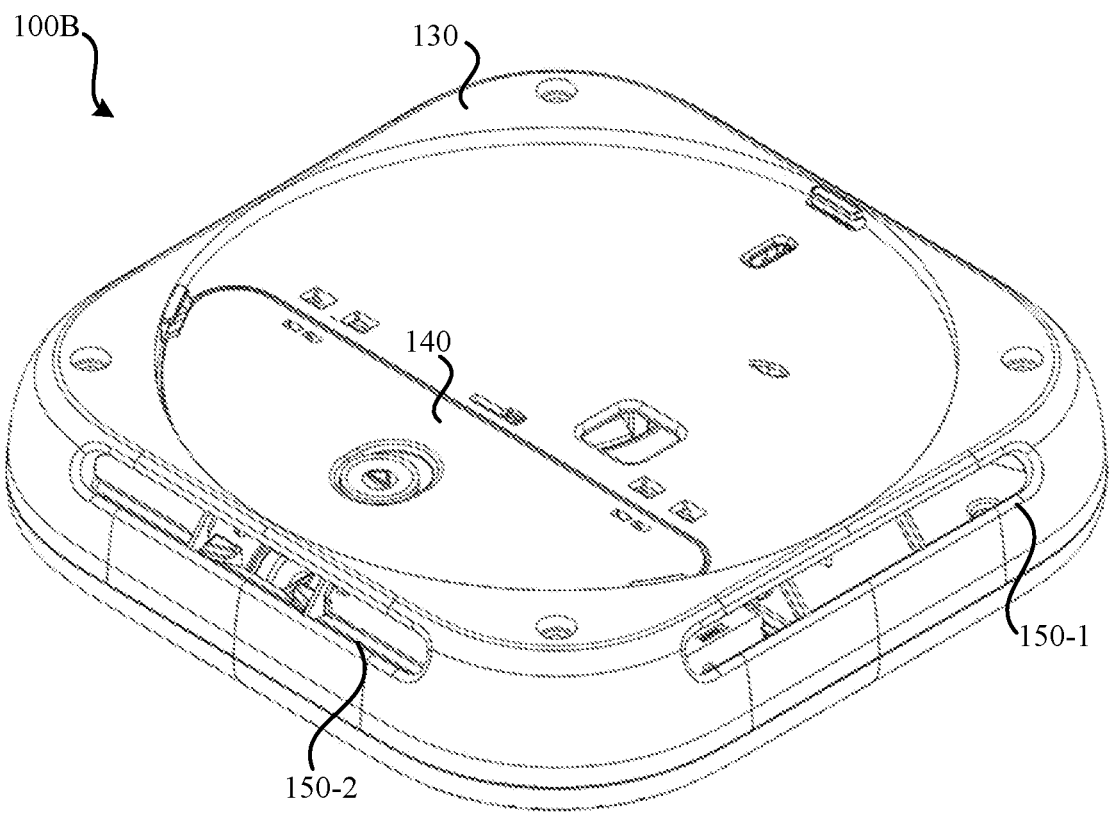

FIG. 1B illustrates an angular bottom projection view of a smart combined smoke detector and carbon monoxide device 100B. It should be understood that device 100A and device 100B may be the same device viewed from different angles. Visible from this view is a portion of enclosure 130. On enclosure 130, battery compartment door 140 is present through which a battery compartment is accessible. Also visible are airflow vents 150-1 and 150-2, which allow air to pass through enclosure 130 and enter the smoke chamber of device 100B.

Figure 2A:
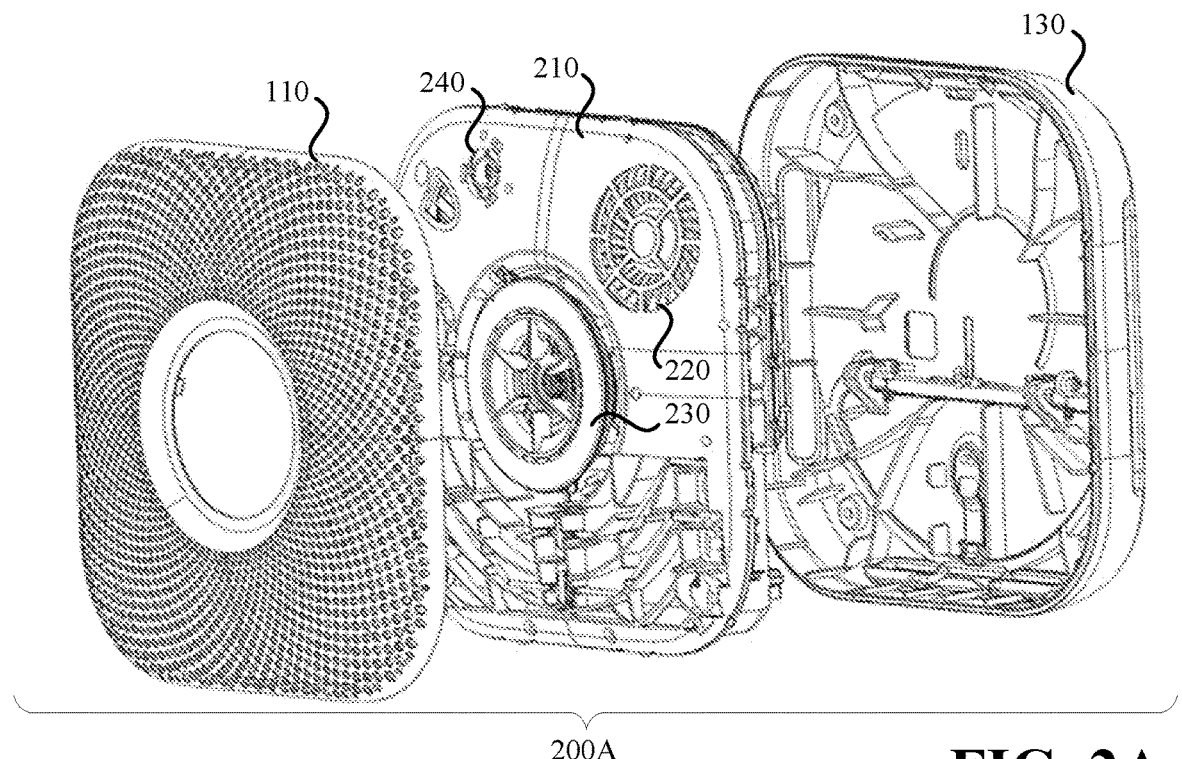
FIGS. 2A, 2B, 2C, and 2D illustrate an embodiment of an exploded smart combined smoke detector and carbon monoxide device.
Figure 2B:
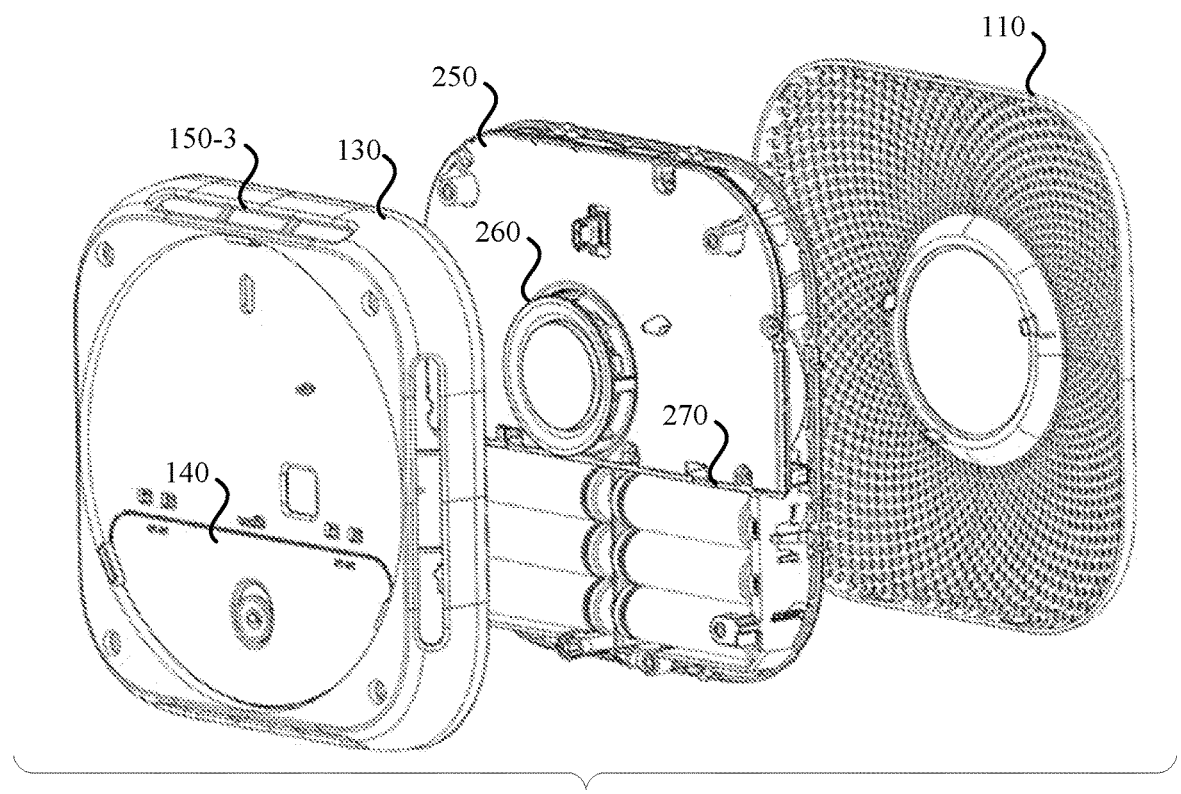
Figure 2C:
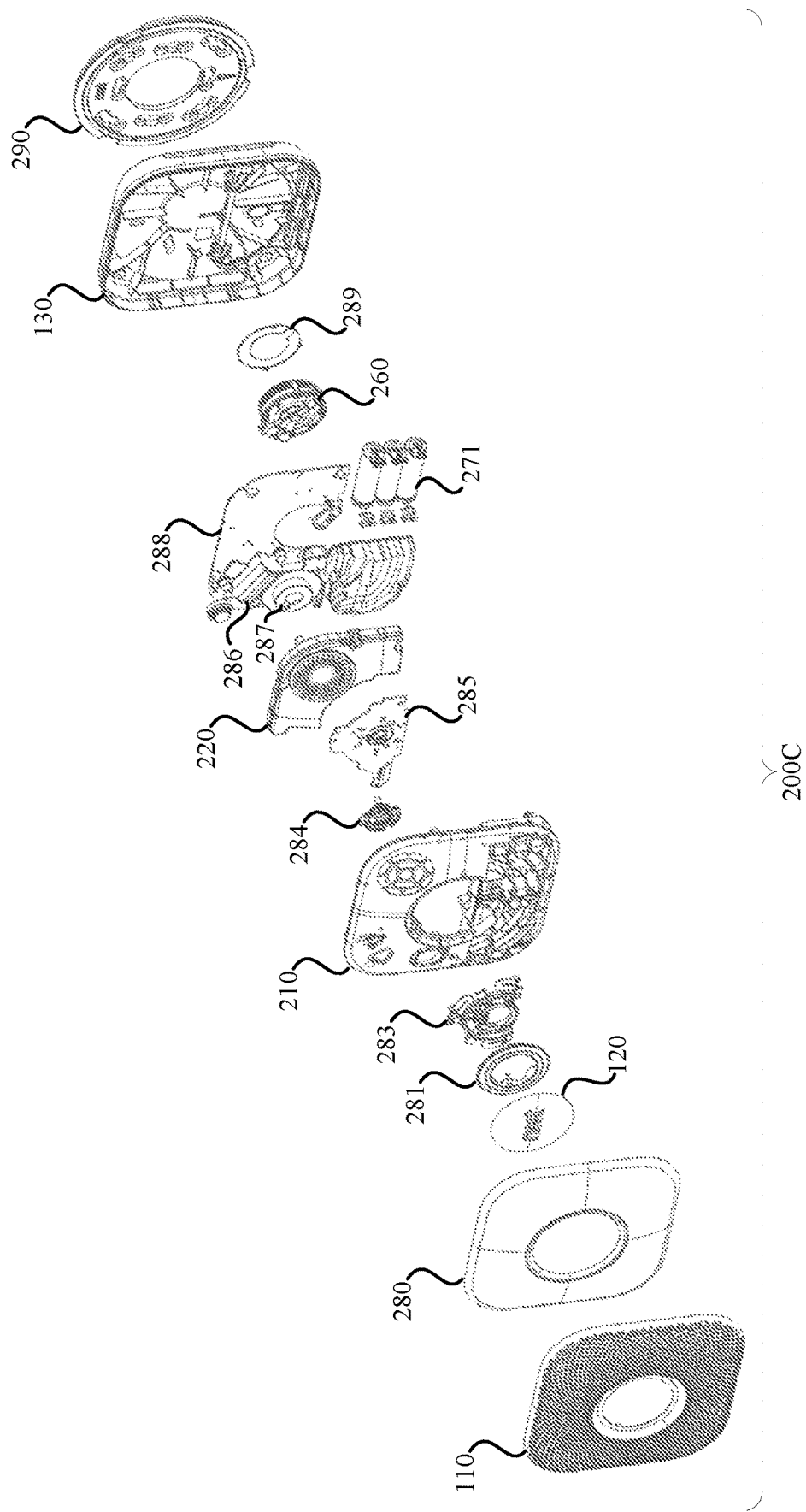

FIGS. 2A, 2B, and 2C illustrate an embodiment of an exploded smart combined smoke detector and carbon monoxide device. The devices of FIGS. 2A-2C can be understood as representing various views of devices 100A and 100B of FIGS. 1A and 1B, respectively. In FIG. 2A, device 200A is shown having cover grille 110 and enclosure 130, which together house main chassis 210. Main chassis 210 may house various components that can be present in various embodiments of device 200A, including speaker 220, light pipe 230, and microphone 240. FIG. 2B of an embodiment of device 200B can be understood as illustrating the same device of FIG. 2A, from a different viewpoint. In FIG. 2B, cover grille 110, enclosure 130, airflow vent 150-3, and battery compartment door 140 are visible. A gap may be present between enclosure 130 and main circuit board 288 to allow airflow through airflow vents 150 to have a relatively unobstructed path to enter and exit smoke chamber 260. Some or all components on main circuit board 288 may be at least partially covered by one or more laminar flow covers, such as laminar flow cover 250. Such laminar flow covers, which can be present on one or both sides of a circuit board, can help laminar air flow within the device and prevent a user from inadvertently touching a component that could be sensitive to touch, such as via electro-static discharge. Also present in FIG. 2B are multiple batteries, which are installed within battery compartment 270 of device 200B and which are accessible via battery compartment door 140.

FIG. 2C represents a more comprehensive exploded view of a smart combined smoke detector and carbon monoxide detector device 200C. Device 200C may represent an alternate view of devices 100A, 100B, 200A, and 200B. Device 200C may include: cover grille 110, mesh 280, lens/button 120, light pipe 281, button flexure 283, main chassis 210, diaphragm 284, passive infrared (PIR) and light emitting diode (LED) daughterboard 285, speaker 220, batteries 271, carbon monoxide (CO) sensor 286, buzzer 287, main circuit board 288, smoke chamber 260, chamber shield 289, enclosure 130, and surface mount plate 290. It should be understood that alternate embodiments of device 200C may include a greater number of components or fewer components than presented in FIG. 2C.

A brief description of the above noted components that have yet to be described follows: Mesh 280 sits behind cover grille 110 to obscure external visibility of the underlying components of device 200C while allowing for airflow through mesh 280. Mesh 280 and grille 110 can help CO more readily enter the interior of the device, where CO sensor 286 is located. Light pipe 281 serves to direct light generated by lights (e.g., LEDs such as the LEDs present on daughterboard 285) to the external environment of device 200C by reflecting off of a portion of cover grille 110. Button flexure 283 serves to allow a near-constant pressure to be placed by a user on various locations on lens/button 120 to cause actuation. Button flexure 283 may cause an actuation sensor located off-center from lens/button 120 to actuate in response to user-induced pressure on lens/button 120. Diaphragm 284 may help isolate the PIR sensor on daughterboard 285 from dust, bugs, and other matter that may affect performance. Daughterboard 285 may have multiple lights (e.g., LEDS) and a PIR (or other form of sensor). Daughterboard 285 may be in communication with components located on main circuit board 288. The PIR sensor or other form of sensor on daughterboard 285 may sense the external environment of device 200C through lens/button 120.

Buzzer 287, which may be activated to make noise in case of an emergency (and when testing emergency functionality), and carbon monoxide sensor 286 may be located on main circuit board 288. Main circuit board 288 may interface with one or more batteries 271, which serve as either the primary source of power for the device or as a backup source of power if another source, such as power received via a wire from the grid, is unavailable. Protruding through main circuit board may be smoke chamber 260, such that air (including smoke if present in the external environment) passing into enclosure 130 is likely to enter smoke chamber 260. Smoke chamber 260 may be capped by chamber shield 289, which may be conductive (e.g., metallic). Smoke chamber 260 may be encircled by a conductive (e.g., metallic) mesh (not pictured). Enclosure 130 may be attached and detached from surface mount plate 290. Surface mount plate 290 may be configured to be attached via one or more attachment mechanism (e.g., screws or nails) to a surface, such as a wall or ceiling, to remain in a fixed position. Enclosure 130 may be attached to surface mount plate 290 and rotated to a desired orientation (e.g., for aesthetic reasons). For instance, enclosure 130 may be rotated such that a side of enclosure 130 is parallel to an edge of where a wall meets the ceiling in the room in which device 200C is installed.

Figure 2D:
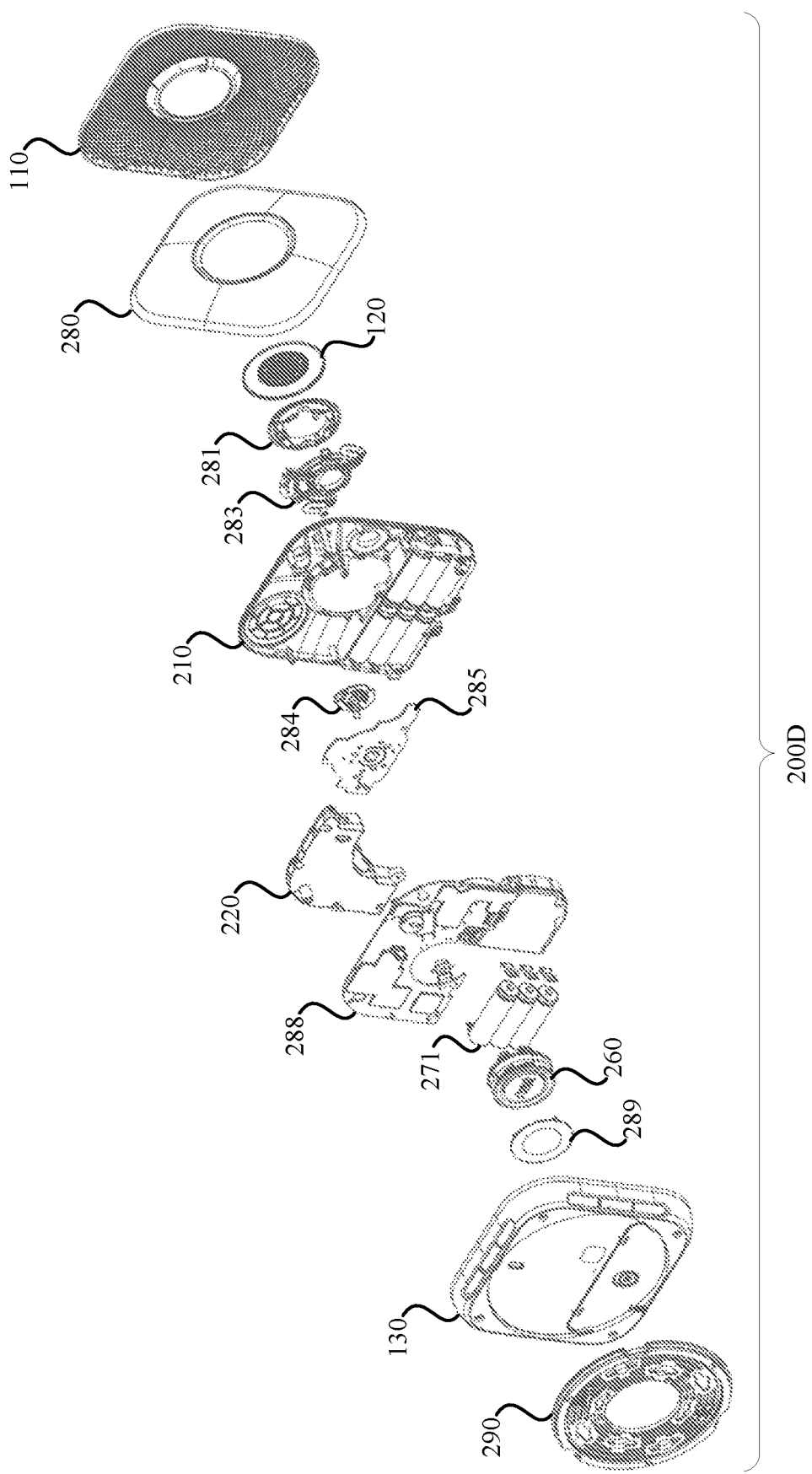

FIG. 2D represents the comprehensive exploded view of the smart combined smoke detector and carbon monoxide detector device of FIG. 2C viewed from a reverse angle as presented in FIG. 2C. Device 200D may represent an alternate view of devices 100A, 100B, 200A, 200B, and 200C. Device 200D may include: cover grille 110, mesh 280, lens/button 120, light pipe 281, button flexure 283, main chassis 210, diaphragm 284, passive infrared (PIR) and light emitting diode (LED) daughterboard 285, batteries 271, speaker 220, carbon monoxide (CO) sensor 286 (not visible), buzzer 287 (not visible), main circuit board 288, smoke chamber 260, chamber shield 289, enclosure 130, and surface mount plate 290. It should be understood that alternate embodiments of device 200D may include a greater number of components or fewer components than presented in FIG. 2C.

FIGS. 3A-3E illustrate an embodiment of a surface mount plate 300 viewed from various angles. FIG. 3A is a front view of surface mount plate 300, FIG. 3B is a side view of surface mount plate 300, FIG. 3C is a rear view of surface mount plate 300, FIG. 3D is a detail view of region 399 (outlined by a dotted circle) of surface mount plate 300, and FIG. 3E is a side view of surface mount plate 300. Surface mount plate 300 may be used as surface mount plate 290 of FIGS. 2C and 2D. Surface mount plate 300 may permit a sensor housing to be coupled via a twisting motion and uncoupled via a reversed twisting motion. Surface mount plate 300 may include: body 310, wire pass-through 320, mounting holes 330, circular lip 315, lip gaps 340, compressible ring 350, feedback nubs 341, rotation stoppers 342.

Body 310 may be formed (e.g., injection-molded) using a rigid material, such as plastic. Present on body 310 may be multiple holes: wire pass-through 320 and mounting holes 330. Wire pass-through 320 may allow for in-wall or in-ceiling wires to be connected with a connector or one or more wires of a sensor housing to be coupled with surface mount plate 300. For instance, many in-home smoke detector systems receive power and/or distribute indications of alarms via wiring installed in the home's walls and/or ceilings. The diameter of wire pass-through 320 may be varied by embodiment. A larger wire pass-through 320 can permit easy access to in-ceiling or in-wall wiring. Mounting holes 330 (e.g., 330-1, 330-2 only two are labeled for simplicity) may be radially distributed around a center of body 310 and may permit fasteners, such as nails and screws, to be secured to a surface through body 310. Each mounting hole may contain multiple fastener locations (e.g., three) that allow fasteners in different positions to be used to secure the surface mounting plate to a surface. By multiple mounting holes being used to secure body 310 to a surface (e.g., ceiling, wall), surface mount plate 300 becomes fixed to the surface such that it cannot rotate or otherwise move. Mounting holes 330 may be distributed radially around body 310 at different distances from a center point of body 310. For example, mounting hole 330-1 is farther from a center of body 310 than mounting hole 330-2. For each mounting hole of mounting holes 330, another mounting hole may be present a same distance from the center of body 310 on the opposite side of wire pass-through 320.

Circular lip 315 may extend at least partially around body 310. Circular lip may be interrupted by lip gaps 340. Circular lip 315 may protrude a distance, such as between 1 and 5 mm, from body edge 311. On one side of the surface mount plate (e.g., as presented in FIG. 3A) circular lip 315 is planar with body 310; on the opposite side of the surface mount plate (e.g., as presented in FIG. 3C), circular lip 315 extends further than body edge 311. As such, circular lip 315 may have a smaller thickness than body 310. Circular lip 315, when aligned with sliders of a sensor housing (e.g., sliders 620 of FIG. 6), may permit the sliders to slide along circular lip 315 while keeping the sensor device coupled with surface mount plate 300. At various intervals around circular lip 315, lip gaps 340 may be present. In some embodiments, a lip gap is present every 120° around circular lip 315; in other embodiments, lip gaps may be present every 90° or at some other angle. Lip gaps 340 may have a height and width sufficient to permit sliders present on the sensor housing to at least partially pass-through lip gaps 340. When lip gaps 340 are aligned with sliders of the sensor housing and such sliders are inserted into lip gaps 340, the sensor housing may then be twisted in either a clockwise and/or counterclockwise direction such that the sliders engage with circular lip 315. Therefore, lip gaps 340 permit sufficient room for sliders of the sensor housing to move to a position where a twisting motion applied to the sensor housing will cause the sliders to slide onto circular lip 315.

FIG. 3D represents a detailed view of region 399 that includes lip gap 340-3 of FIGS. 3A, 3C, and 3E. Present on circular lip 315 may be feedback nubs 341 (341-1, 341-2,

341-3, 341-4). Feedback nubs may be intended to provide a user with tactile feedback to indicate when a slider of a sensor housing has become fully coupled with circular lip 315 of the surface mount plate 300. Feedback nubs 341 may be located immediately or almost immediately adjacent (e.g., within 1-5 mm) of lip gaps 340 along circular lip 315. Therefore, when a slider of a sensor housing is aligned with a lip gap, such as the lip gap 340-3 and twisted such that the slider engages with circular lip 315, a user twisting the sensor housing will feel the slider pass over feedback nub 341-3. When the user feels the slider pass over feedback nub 341-3, the slider is fully engaged with circular lip 315. While fully engaged, additional rotation may be performed for aesthetic reasons or to get to a rotational alignment desired by the installer. Therefore, a range of rotation, such as hundred degrees, is available for a user to select a preferred aesthetic position of the sensor housing relative to the surface mount plate. In some embodiments, one or more feedback nubs are present. In other embodiments, feedback nubs may be positioned next to each lip gap of lip gaps 340. In some embodiments, the feedback nub may provide auditory feedback instead of or in addition to tactile feedback to the user.

Along circular lip 315, rotation stoppers 342 (342-1, 342-2, 342-3) may be present. Rotation stoppers 342 may be located on circular lip 315 on the opposite side of lip gaps 340 from feedback nubs 341. Rotation stoppers 342 may serve to prevent sliders of a sensor housing from rotating any further along circular lip 315. For instance, rotation stoppers 342 may be positioned immediately adjacent to lip gaps 340 along circular lip 315 to prevent sliders of the sensor housing from entering a lip gap when being rotated in a direction associated with coupling. For ease of use, a clockwise direction may cause the sliders to engage with the circular lip and rotation stoppers 342 may prevent disengagement in such direction. A counterclockwise direction may cause the sliders to move back to the lip gap over the feedback nubs, which in this direction of rotation indicates that decoupling of the sliders from the circular lips has partially occurred or is about to occur. In some embodiments, one or more rotation stoppers are present. In other embodiments, rotation stoppers 342 may be positioned on circular lip 315 next to each lip gap of lip gaps 340 (on the opposite side of feedback nubs 341).

Compressible ring 350 may be made of foam or some other compressible material. Compressible ring 350 may be compressed between body 310 and a sensor housing when surface mount plate 300 is coupled with a sensor housing. Compressible ring 350 may be continuous (e.g., it forms a full circle) and may be in the range of 3-30 mm in width. When compressed between body 310 and a sensor housing, compressible ring 350 may help prevent air from passing between body 310 and the sensor housing. Namely, compressible ring 350 may help prevent air within the wall or ceiling from passing through wire pass-through 320 and/or mounting holes 330 between body 310 and the sensor housing and into the immediate environment of the sensor. (Such an arrangement may be useful to prevent a positive air pressure in a ceiling or wall from pushing air into the environment of the sensor and preventing the sensor from sensing a hazardous condition present in the room.) Compressible ring 350 may also provide rotational friction between the sensor mounting plate and the sensor housing while still allowing for non-indexed rotation of the sensor housing with respect to surface mount plate 300. Thus, compressible ring 350 may provide force against a user rotating the sensor housing relative to surface mount plate 300 (thus providing a pleasing feedback to the user). The friction caused by compressed compressible ring 350 may further help maintain the sensor housing in a particular rotational alignment to surface mount plate 300. That is, the friction caused by compressible ring 350 would be sufficient to prevent incidental forces, such as environmental vibration and/or forces exerted by wires attached to the sensor, from causing rotation of the sensor housing relative to surface mount plate 300. In some embodiments, compressible ring 350 causes at least 0.56 Newton-meters (5.00 Inch-Pounds) of static friction. In some embodiments, compressible ring 350 causes at least 0.46 Newton-meters (4.10 Inch-Pounds) of static friction. In some embodiments, compressible ring 350 causes at least 0.69 Newton-meters (6.10 Inch-Pounds) of static friction. Since a purpose of compressible ring 350 is to prevent the sensor housing from rotating due to forces such as environmental vibration and/or force exerted by wires connected with the sensor, a minimum amount of static friction, such as any value between 0.40 Newton-meters and 0.80 Newton-meters may be caused by compressible ring 350, thus causing the sensor housing to remain in position with relation to the mounting plate unless a greater torque force is applied to the sensor housing. It should be understood that the amount of static friction can be adjusted by adjusting the amount and/or type of material of compressible ring 350.

In some embodiments, a compressible ring is also present on the opposite side of the sensor mounting plate illustrated in FIG. 3C. This compressible ring (not pictured) may help prevent air from passing between a surface to which the surface mount plate is mounted and the surface mount plate. This compressible ring may be located near body edge 311.

Symbol 355 may inform a user of which side of the surface mount plate should face away from the surface. In this instance, symbol 355 indicates that the fasteners are to be attached with the side of surface mount plate of FIG. 3A facing away from the surface.

Figure 4:
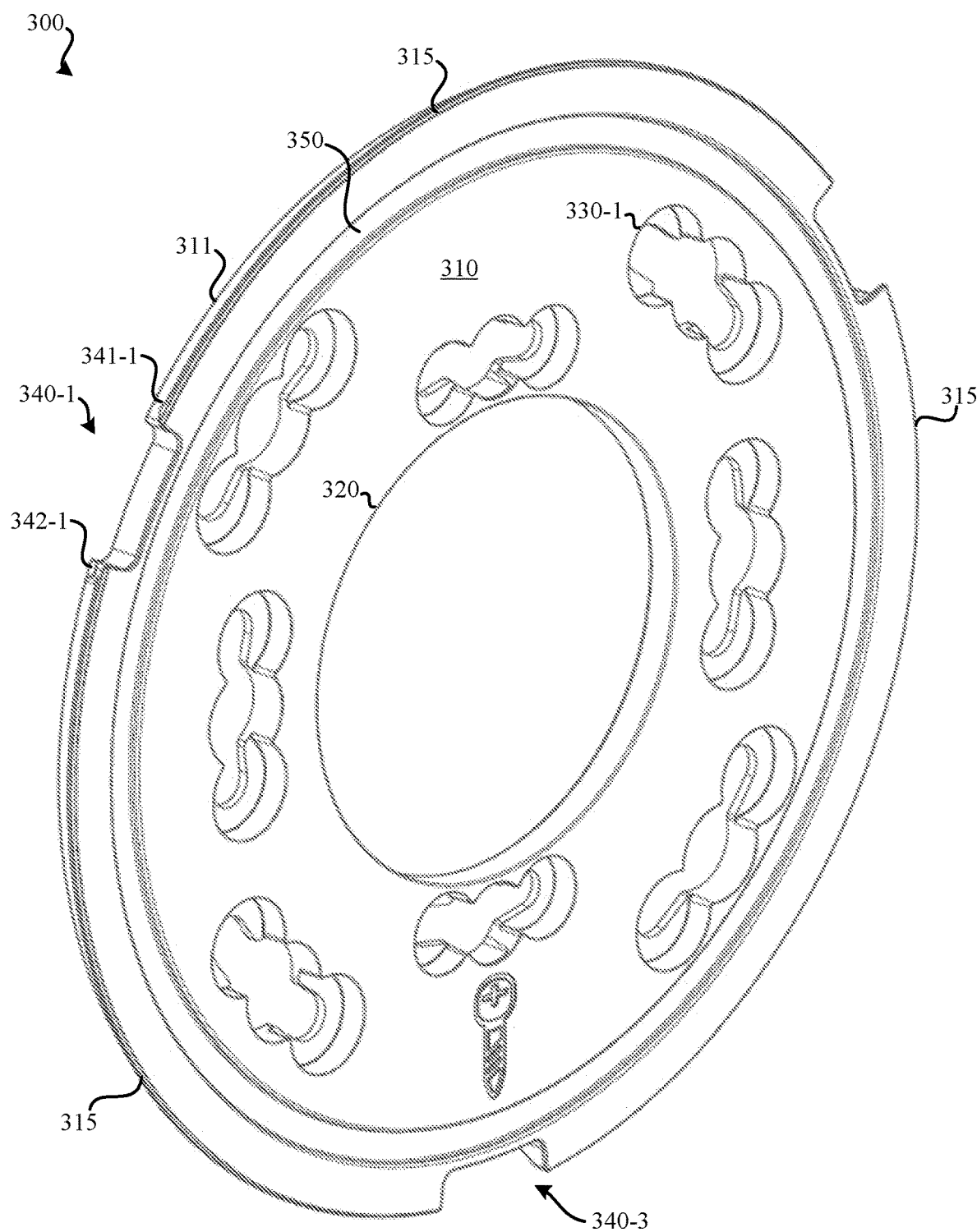
FIG. 4 illustrates an embodiment of a surface mount plate of a surface mount system viewed from an angle showing a first side of the surface mount plate.
Figure 5:
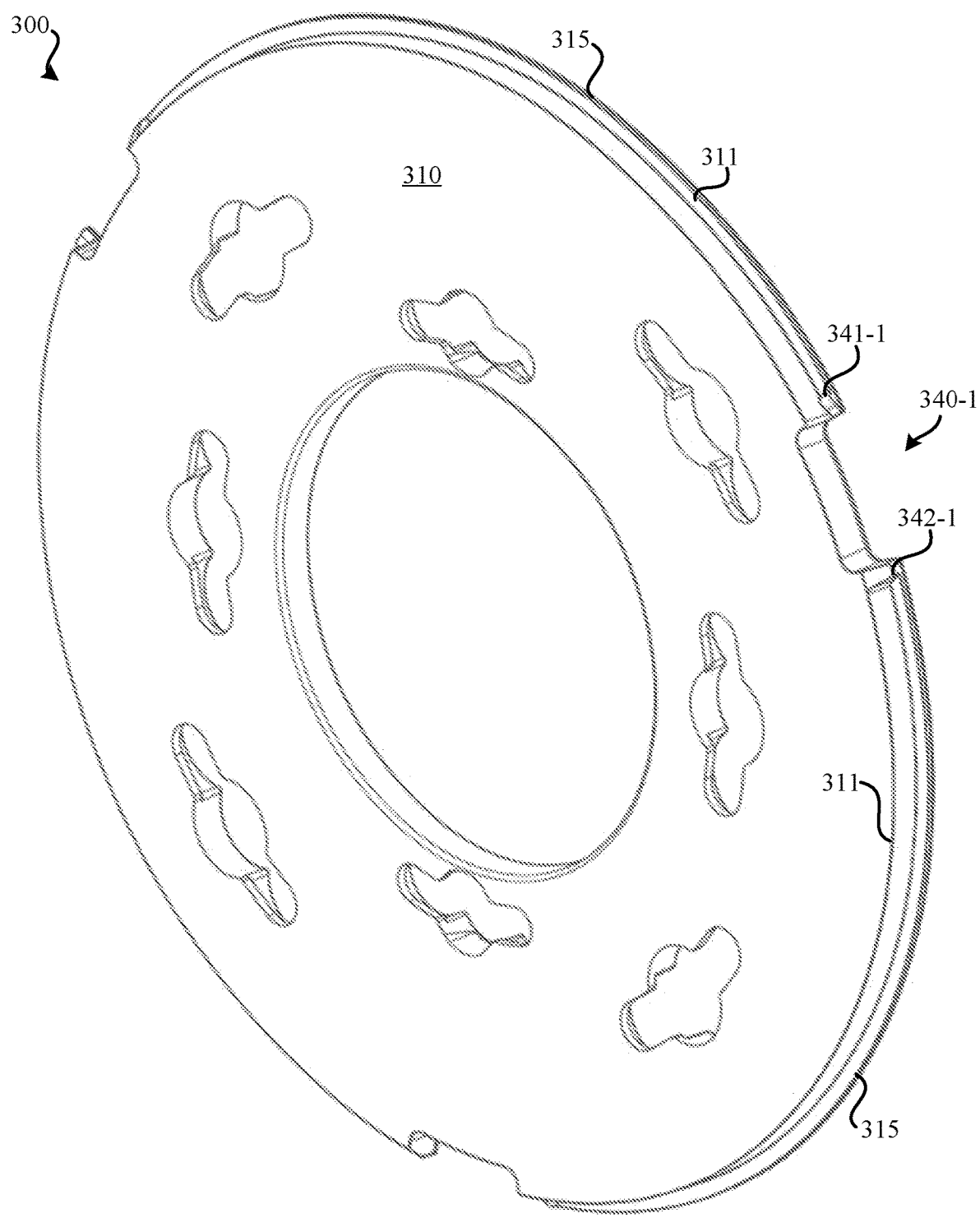
FIG. 5 illustrates an embodiment of a surface mount plate of a surface mount system viewed from an angle showing a second side of the surface mount plate.

FIG. 4 illustrates an embodiment of surface mount plate 300 of a surface mount system viewed from an angle showing a first side of the surface mount plate (which is also illustrated in FIG. 3A). Visible in FIG. 4 is lip gap 340-1, along with the accompanying feedback nub 341-1 and rotation stopper 342-1 which function as detailed in relation to FIGS. 3A-3E. FIG. 5 illustrates an embodiment of surface mount plate 300 of a surface mount system viewed from an angle showing a second, rear side of the surface mount plate (which is also illustrated in FIG. 3C). Visible in FIG. 5 is lip gap 340-1, along with the accompanying feedback nub 341-1 and rotation stopper 342-1 which function as detailed in relation to FIGS. 3A-3E.

Figure 6:
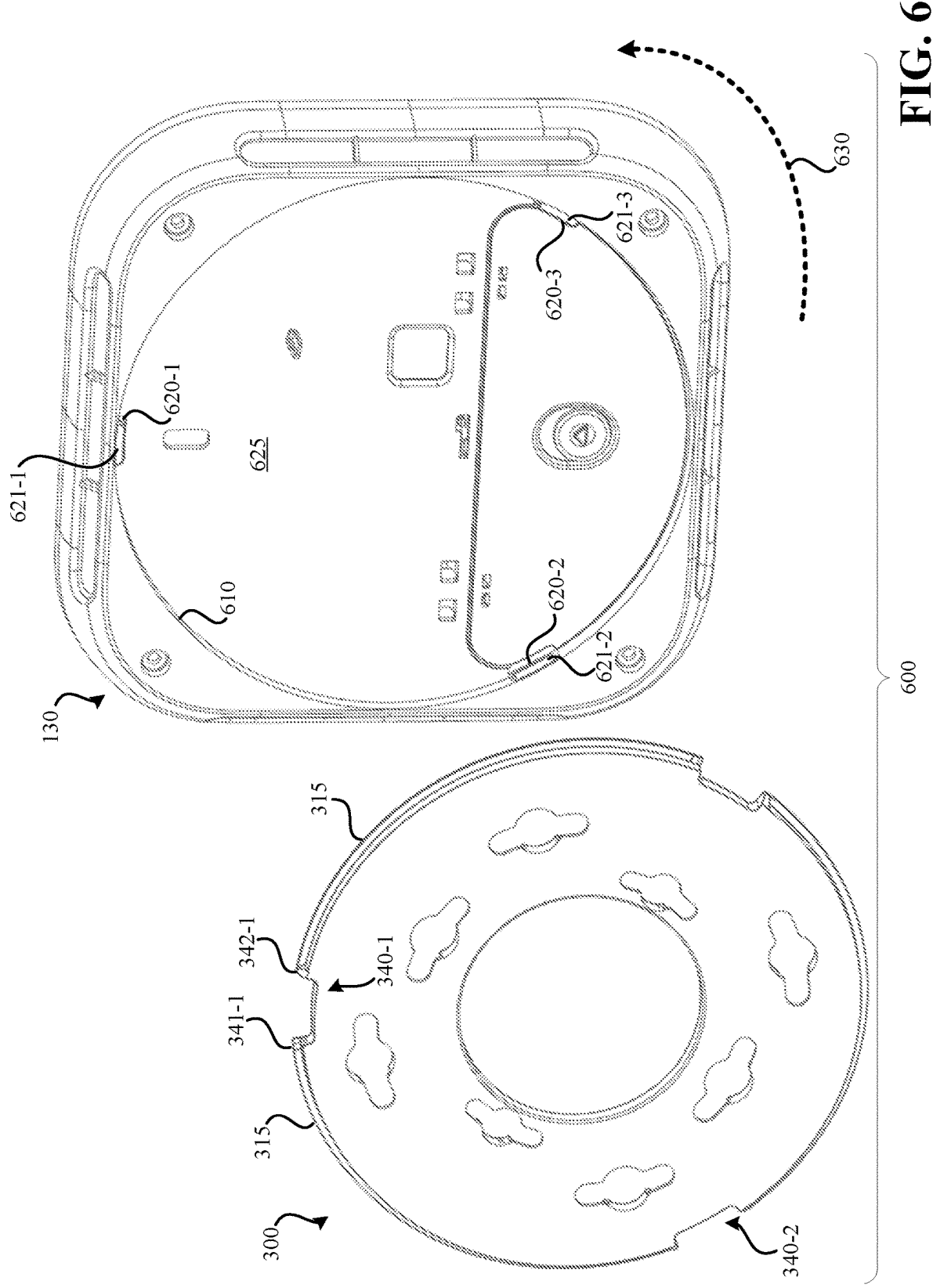
FIG. 6 illustrates an embodiment of a surface mount system including a mounting plate and a sensor housing with which the surface mount plate removably couples.

FIG. 6 illustrates an embodiment of a surface mount system 600 that includes surface mount plate 300 and sensor housing 130 with which surface mount plate 300 removably couples. Surface mount plate 300 may be used as surface mount plate 290 in FIGS. 2C and 2D with sensor housing 130.

Sensor housing 130 includes circular depression 610 and sliders 620 (e.g., sliders 620-1, 620-2, and 620-3). Sliders 620 may be distributed on sensor housing 130 to match the distribution of lip gaps 340 of surface mount plate 300. Circular depression 610 may represent a depressed portion of sensor housing 130. Sliders 620 may be located within circular depression 610 such that outer surfaces 621 of sliders 620 are depressed with circular depression 610. When surface mount plate 300 is aligned with circular depression but sliders 620 are not aligned with lip gaps 340, surface mount plate 300 may seat itself within circular depression 610 and rest on the outer surfaces 621 of sliders 620. From this position, sensor housing 130 can be rotated clockwise or counterclockwise until sliders 620 align with lip gaps 340. Once aligned, surface mount plate 300 may further enter circular depression 610 when force is applied to sensor housing 130. Rotation 630 of sensor housing 130 may cause sliders 620 to engage with circular lip 315 by circular lip 315 passing between sliders 620 and body 625. When one or more of sliders 620 pass over feedback nubs 341, the user may receive auditory and/or tactile feedback. Once sliders 620 have rotated past feedback nubs 341, sensor housing 130 is fully coupled with surface mount plate 300, and further rotation may be performed for aesthetic reasons or otherwise as desired by the installer. To remove sensor housing 130 from surface mount plate 290, the rotation can be reversed, or, if rotation stoppers 342 are not present, rotation can be continued in the same direction as used for mounting until sliders 620 align with lip gaps 340. Once alignment occurs, sensor housing will fall away from surface mount plate 300 (e.g., due to gravity) or can otherwise be pulled away.

In FIGS. 3-6 and the accompanying description, the slider are located on the sensor housing and the circular lip, lip gaps, feedback nubs, and rotation stoppers are located on the surface mount plate. It should be understood that, in other embodiments, the location of components of the surface mounting system can be reversed: that is, the circular lip, lip gaps, feedback nubs, and rotation stoppers may be part of the sensor housing and the surface mount plate may have sliders. Based on the previous description, such embodiments may be created by reversing the locations of various components.

FIGS. 7A-13 are directed to a separate embodiment of a surface mount plate and sensor housing. Such embodiments may permit a sensor housing to be coupled by the sensor housing being pushed against the surface mount plate and uncoupled via a twisting motion. FIGS. 7A, 7B, 7C, 7D, and 7E illustrate an embodiment of a surface mount plate of a surface mount system viewed from various angles. FIG. 7A is a front view of surface mount plate 700, FIG. 7B is a side view of surface mount plate 700, FIG. 7C is a rear view of surface mount plate 700, FIG. 7D is another side view of surface mount plate 700, and FIG. 7E is a detail view of region 799 (outlined by a dotted circle) of surface mount plate 700. Surface mount plate 700 may be used as surface mount plate 290 of FIGS. 2C and 2D (along with a modified sensor housing 130). Surface mount plate 700 may include: body 710, wire pass-through 718, mounting holes 730 (of which only two mounting holes are indicated for simplicity of the figures, 730-1 and 730-2), circular lip 715, compressible ring 750, body edge 711, and protuberant nubs 720.

Body 710 may be formed (e.g., injection-molded) using a rigid material, such as plastic. Present on body 710 may be multiple holes: wire pass-through 718 and mounting holes 730. Wire pass-through 718 may allow for in-wall or in-ceiling wires to be connected with a connector or one or more wires from a sensor housing to be coupled with surface mount plate 700. For instance, many in-home smoke detector systems receive power and/or distribute indications of alarms via wiring installed in the structure's walls and/or ceilings. The diameter of wire pass-through 718 may be varied by embodiment. A larger wire pass-through 718 can permit easy access to in-ceiling or in-wall wiring. Mounting holes 730 may be radially distributed around a center of body 710 and may permit fasteners to be secured to a surface through body 710. Each mounting hole may contain multiple fastener locations (e.g., 3) that allow fasteners in different positions to be used to secure surface mount plate 700 to a surface. By multiple mounting holes being used to secure body 710 to a surface (e.g., ceiling, wall), the surface mount plate becomes fixed to the surface such that it cannot rotate or otherwise move. Mounting holes 730 may be distributed radially around body 710 at different distances from a center point of body 710. For example, mounting hole 730-1 is farther from a center of body 710 than mounting hole 730-2. For each mounting hole, another mounting hole may be present a same distance from the center of body 710 on the opposite side of wire pass-through 718.

Circular lip 715 may extend fully around body 710. Circular lip 715 may protrude a distance, such as between 1 and 5 mm, from body edge 711. On one side of surface mount plate 700 (e.g., as presented in FIG. 7A), circular lip 715 is planar with body 710; on the opposite side of the surface mount plate (e.g., as presented in FIG. 7C), circular lip 715 extends further than body edge 711. This difference in diameter can be seen in FIG. 7D. As such, circular lip 715 has a smaller thickness than body 710. Circular lip 715 may actuate slider clips when the sensor housing is pushed against surface mount plate 700. Once the sensor housing is aligned and pushed close enough to surface mount plate 700, slider clips of the sensor housing may detachably couple with circular lip 715. Such slider clips may hold the sensor housing to surface mount plate 700 while allowing the sensor housing to be rotated.

Circular lip 715, when engaged with slider clips of a sensor housing, allows for the sensor housing to be rotated with non-indexed movement while remaining fully engaged with circular lip 715 of surface mount plate 700. At various intervals around circular lip 715, protuberant nubs 720 (e.g., protuberant nub 720-1) may be present. In some embodiments, a protuberant nub is present every 120° or 90° around circular lip 315. Protuberant nubs 720 may serve to actuate slider clips of a sensor housing when the sensor housing is rotated such that slider clips are pushed away from circular lip 715 by protuberant nubs 720. By pushing slider clips of a sensor housing away from circular lip 715, the sensor housing becomes either fully or partially disengaged from circular lip 715, allowing the sensor housing to be pulled away from surface mount plate 700, which remains fixed to a surface by fasteners.

When surface mount plate 700 is engaged with a sensor housing and protuberant nubs 720 are not aligned with slider clips, slider clips remain engaged with circular lip 715 and allow the sensor housing to be rotated relative to surface mount plate 700. This, surface mount plate 700 can be mounted to a surface with little regard to rotational alignment: once the sensor housing is coupled with circular lip 715, the sensor housing can be rotated to a desired rotational alignment (e.g., with an external surface or object).

FIG. 7E represents a detailed view of circled protuberant nub 720-1 of FIGS. 7B, 7C, and 7D in region 799. Present on circular lip 715 may be protuberant nub 720-1. Protuberant nub 720-1 may extend from body edge 711 to match a diameter or exceed a diameter of circular lip 715. At least two sides of protuberant nubs 720 may be angled such that when the sensor housing is rotated and make contact with protuberant nubs 720, the protuberant nubs 720 push the slider clips away from circular lip 715, causing the slider clips to disengage from circular lip 715.

Compressible ring 750 may perform similarly to compressible ring 350 of FIG. 3A. In some embodiments, a compressible ring is also present on the opposite side of surface mount plate 700, such as illustrated in FIG. 7C. This compressible ring (not pictured) may help prevent air from passing between a surface to which the surface mount plate is mounted and the surface mount plate. This compressible ring may be located near body edge 711.

Figure 8:
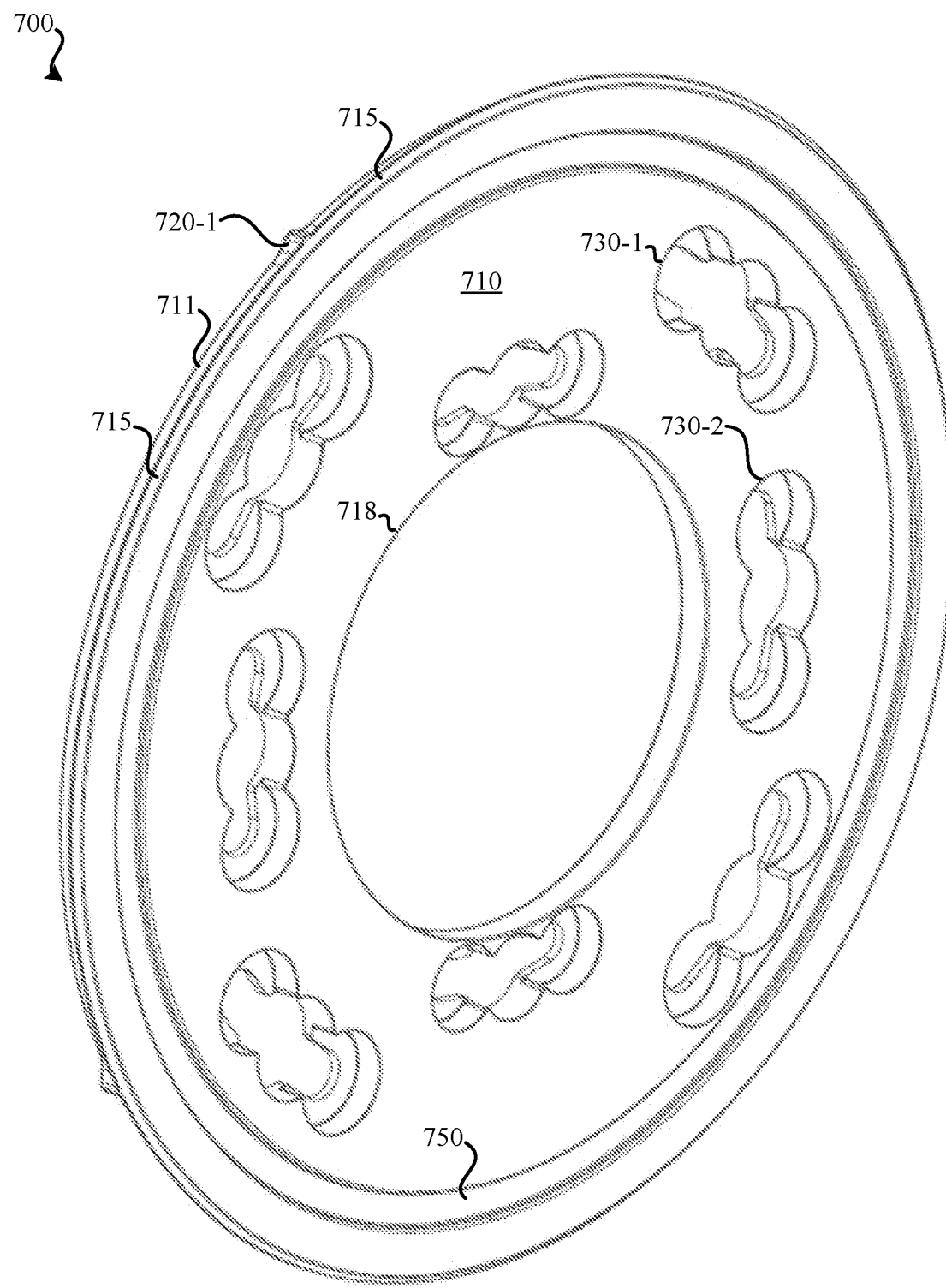
FIG. 8 illustrates an embodiment of a surface mount plate of a surface mount system viewed from an angle showing a first side of the surface mount plate.
Figure 9:
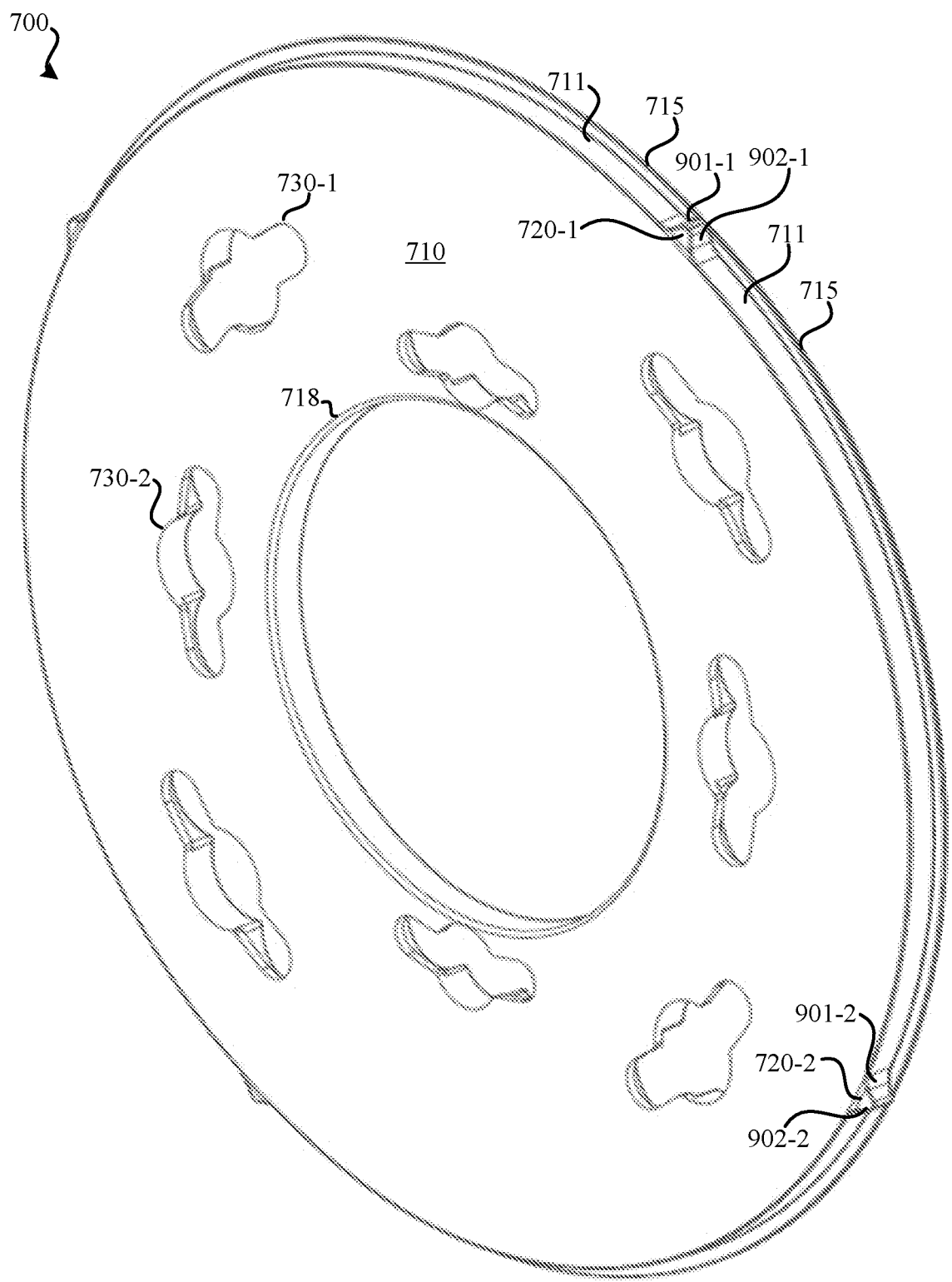
FIG. 9 illustrates an embodiment of a surface mount plate of a surface mount system viewed from an angle showing a second side of the surface mount plate.

FIG. 8 illustrates an embodiment of surface mount plate 700 of a surface mount system viewed from an angle showing a front side of surface mount plate 700. FIG. 9 illustrates an embodiment of surface mount plate 700 of a surface mount system viewed from an angle showing the rear of surface mount plate 700. In these views, it can be seen how protuberant nub 720-1 protrudes from body edge 711 to match the diameter of circular lip 715. Slanted edges 901 and slanted edges 902 serve to cause a slider clip to disengage when the sensor housing is rotated with respect to surface mount plate 700 while the sensor housing and surface mount plate 700 are coupled.

Figure 10:
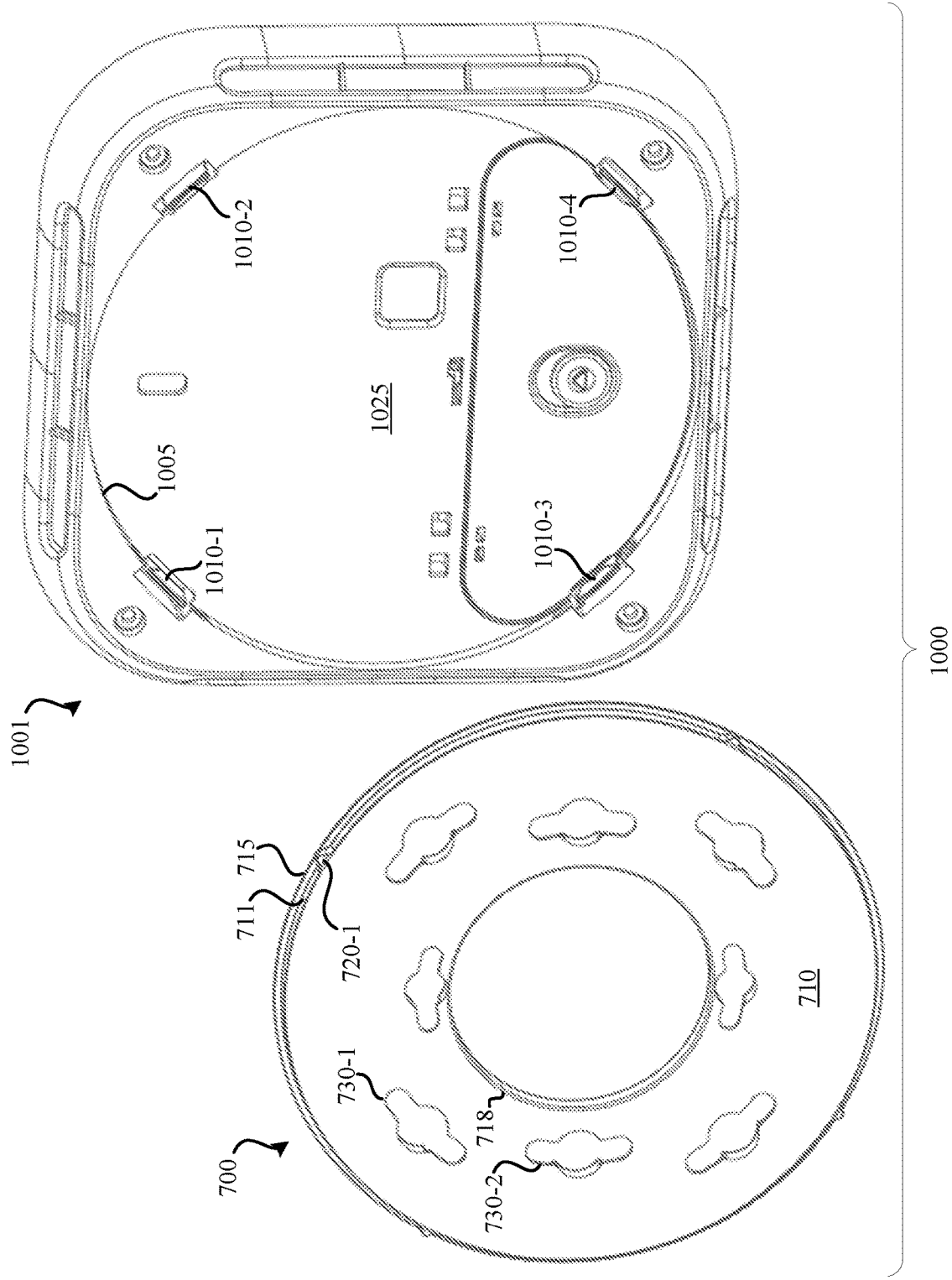
FIG. 10 illustrates an embodiment of a surface mount system including a mounting plate and a sensor housing with which the surface mount plate removably couples.

FIG. 10 illustrates an embodiment of a surface mount system 1000 including a surface mount plate 700 and sensor housing 1001 with which the surface mount plate 700 removably couples. Referring back to FIGS. 2C and 2D, it should be understood that surface mount system 1000 can be used in place of sensor housing 130 and surface mount plate 290.

Sensor housing 1001 includes circular depression 1005 and slider clips 1010 (e.g., slider clips 1010-1, 1010-2, 1010-3, and 1010-4). Slider clips 1010 may be distributed on sensor housing 1001 to match the distribution of protuberant nubs 720 of surface mount plate 700. Slider clips 1010 are defined to be clips that can be actuated to couple and decouple with circular lip 715 and, when coupled with circular lip 715, can slide along circular lip 715. Circular depression 1005 may represent a depressed portion of body 1025 of sensor housing 1001. Slider clips 1010 may be located along an outer edge of circular depression 1005. When surface mount plate 700 is aligned with circular depression and pressure is applied between surface mount plate 700 and sensor housing 1001, surface mount plate 700 may seat itself within circular depression 1005 by circular lip actuating slider clips 1010. Slider clips 1010 may then return to their unactuated positions and couple with circular lip 715.

Figure 11:
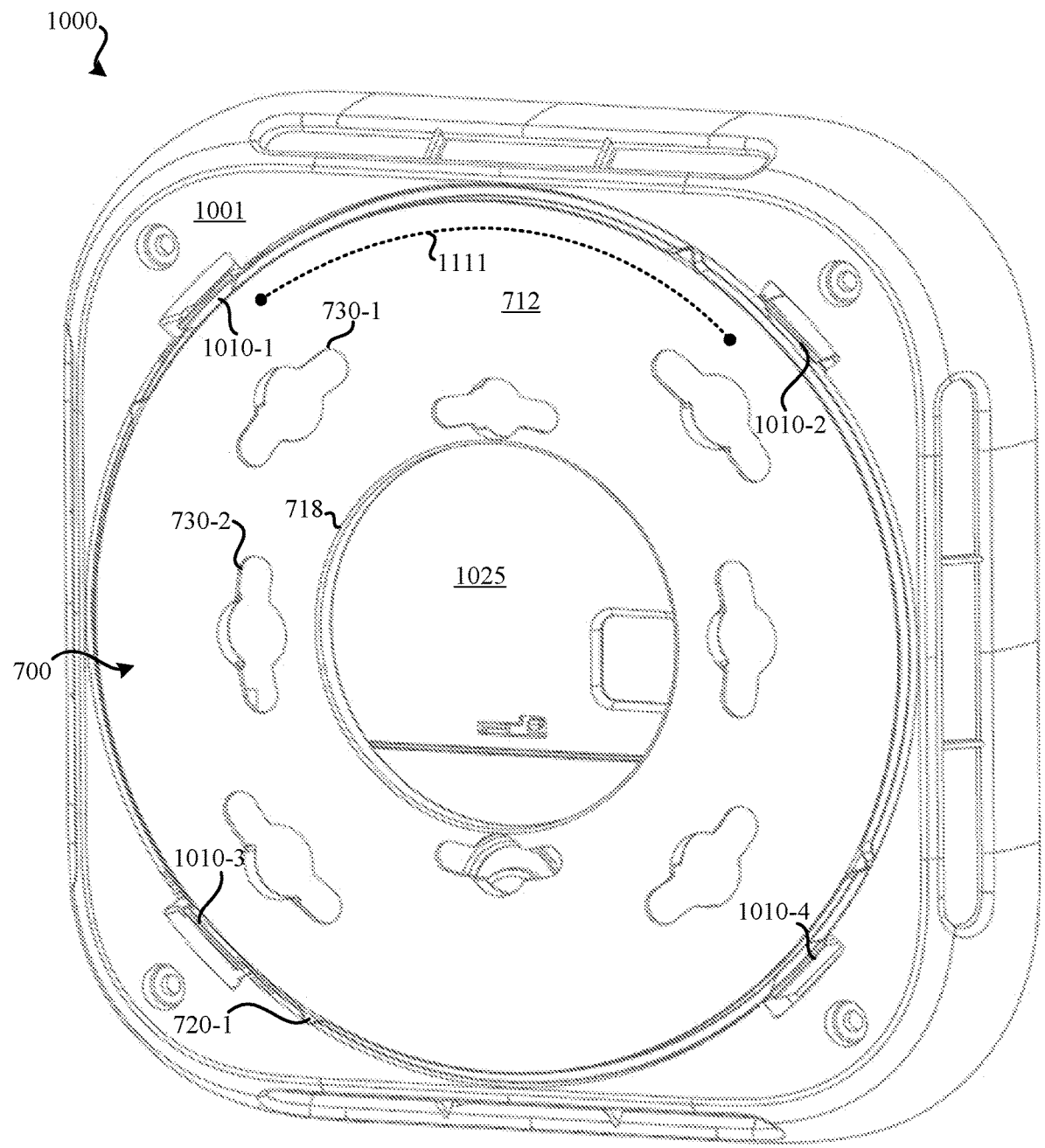
FIG. 11 illustrates an embodiment of a surface mount system including a mounting plate and a sensor housing with which the surface mount plate is fully coupled.

FIG. 11 illustrates an embodiment of a surface mount system 1000 in which sensor housing 1001 and surface mount plate 700 are fully coupled. To achieve this position, sensor housing 1001 was aligned with surface mount plate 700 and pressure was applied, causing slider clips 1010 to actuate and couple with circular lip 715. When pressure is applied, sensor housing 1001 may be rotationally aligned such that protuberant nubs 720 do not align with slider clips 1010. Range of motion 1111 is indicative of an amount of rotation that can be made of sensor housing 1001 with respect to surface mount plate 700 without actuating slider clips 1010. Throughout range of motion 1111, sensor housing 1001 remains fully engaged with and coupled to surface mount plate 700.

Figure 12:
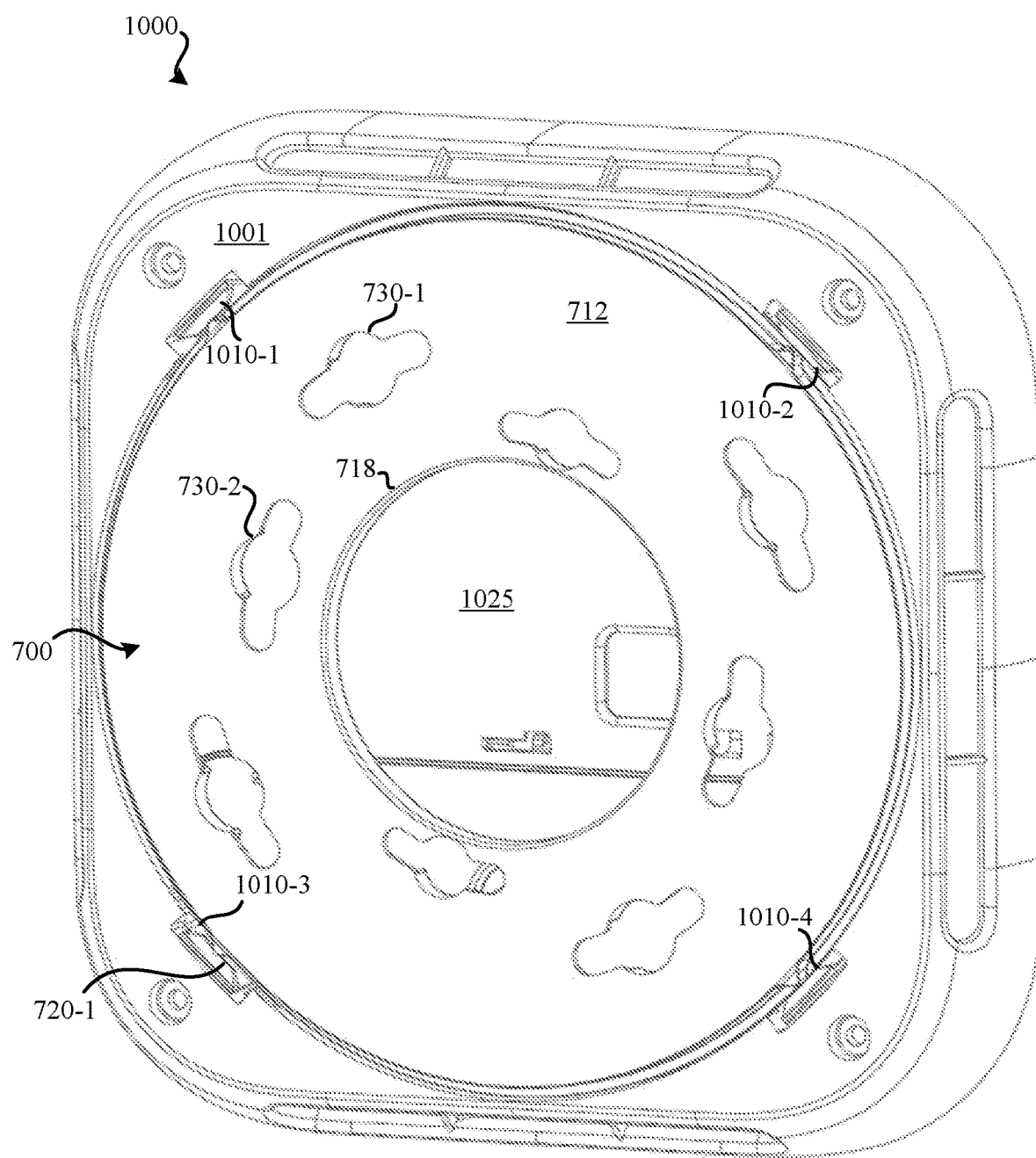
FIG. 12 illustrates an embodiment of a surface mount system including a mounting plate and a sensor housing with which the surface mount plate is actuating the slider clips for removal.

FIG. 12 illustrates an embodiment of a surface mount system 1000 in which sensor housing 1001 has been rotated with respect to surface mount plate 700 such that protuberant nubs 720 engage slider clips 1010. To achieve this position, sensor housing 1001 was rotated with respect to surface mount plate 700 while coupled (e.g., as in FIG. 11), causing slider clips 1010 to actuate and at least partially disengage from circular lip 715. In this state, sensor housing 1001 may be pulled away from surface mount plate 700.

Figure 13:
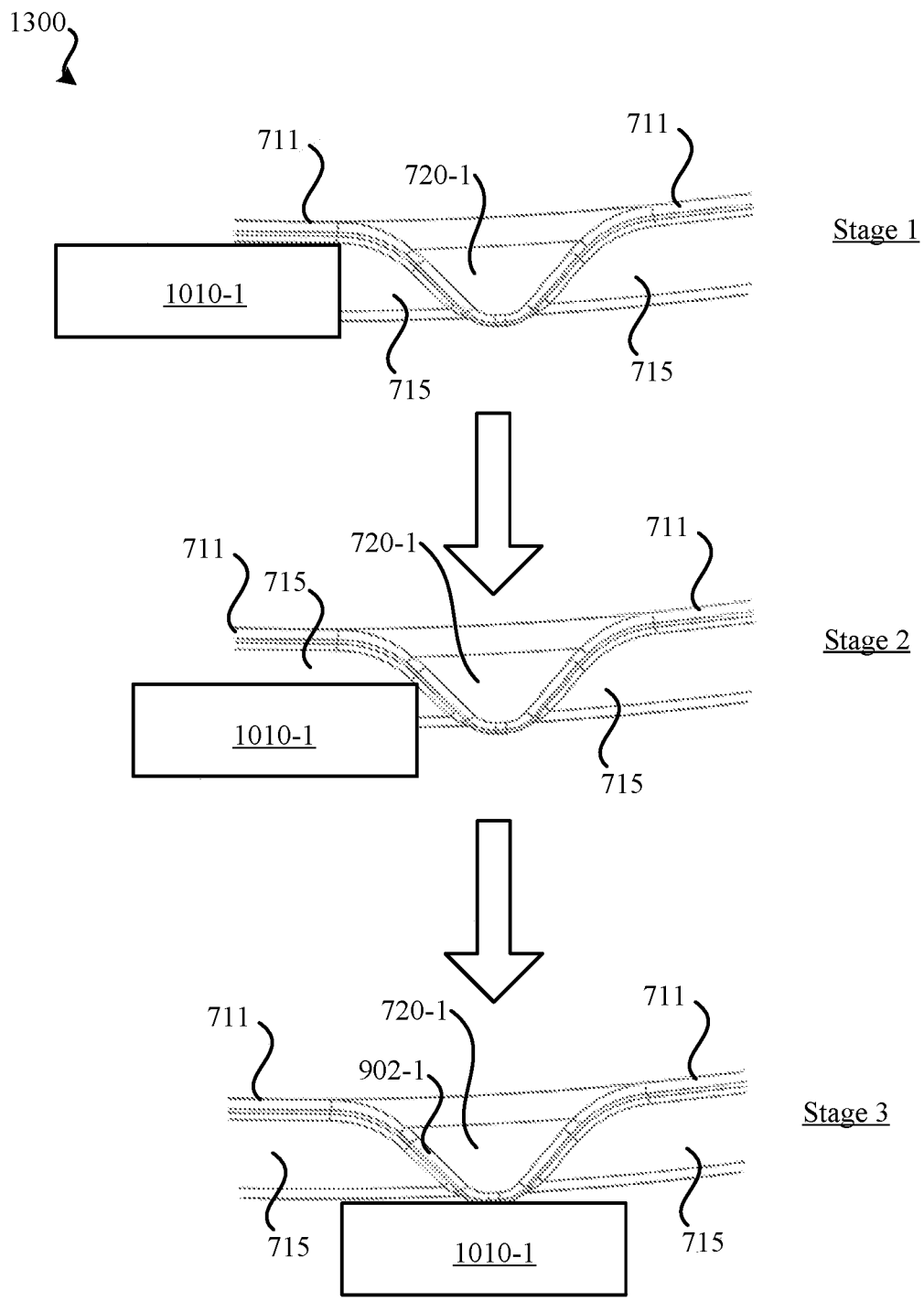
FIG. 13 illustrates an embodiment of a detailed view of a protuberant nub actuating a slider clip.

FIG. 13 illustrates an embodiment of a detailed three stage progression of a protuberant nub actuating a slider clip. In embodiment 1300, slider clip 1010-1 is initially fully engaged with circular lip 715 at stage one. Slider clip 1010-1 is coupling a sensor housing with surface mount plate 700. As the sensor housing is rotated at stage two, slider clip 1010-1 begins to be actuated by protuberant nub 720-1 and begins to disengage from circular lip 715. Slanted edge 902-1 pushes slider clip 1010-1 outward over circular lip 715. As the sensor housing is continued to be rotated, slider clip 1010-1 becomes further actuated by protuberant nub 720-1 and either completely or nearly completely disengages from circular lip 715 at stage three. If rotation continues or is reversed, slider clip 1010-1 would re-engage with circular lip 715. It should be understood that all slider clips may be actuated at the same time by the protuberant nubs of the surface mount plate such that all slider clips disengage from the circular lip to permit the sensor housing to be detached from the surface mount plate.

In FIGS. 7-13 and the accompanying description, the slider clips are located on the sensor housing and the circular lip and protuberant nubs are located on the surface mount plate. It should be understood that, in other embodiments, the location of components of the surface mounting system can be reversed: that is, the circular lip and protuberant nubs may be part of the sensor housing and the surface mount plate may have slider clips. Based on the previous description, such embodiments may be created by reversing the locations of various components.

Figure 14:
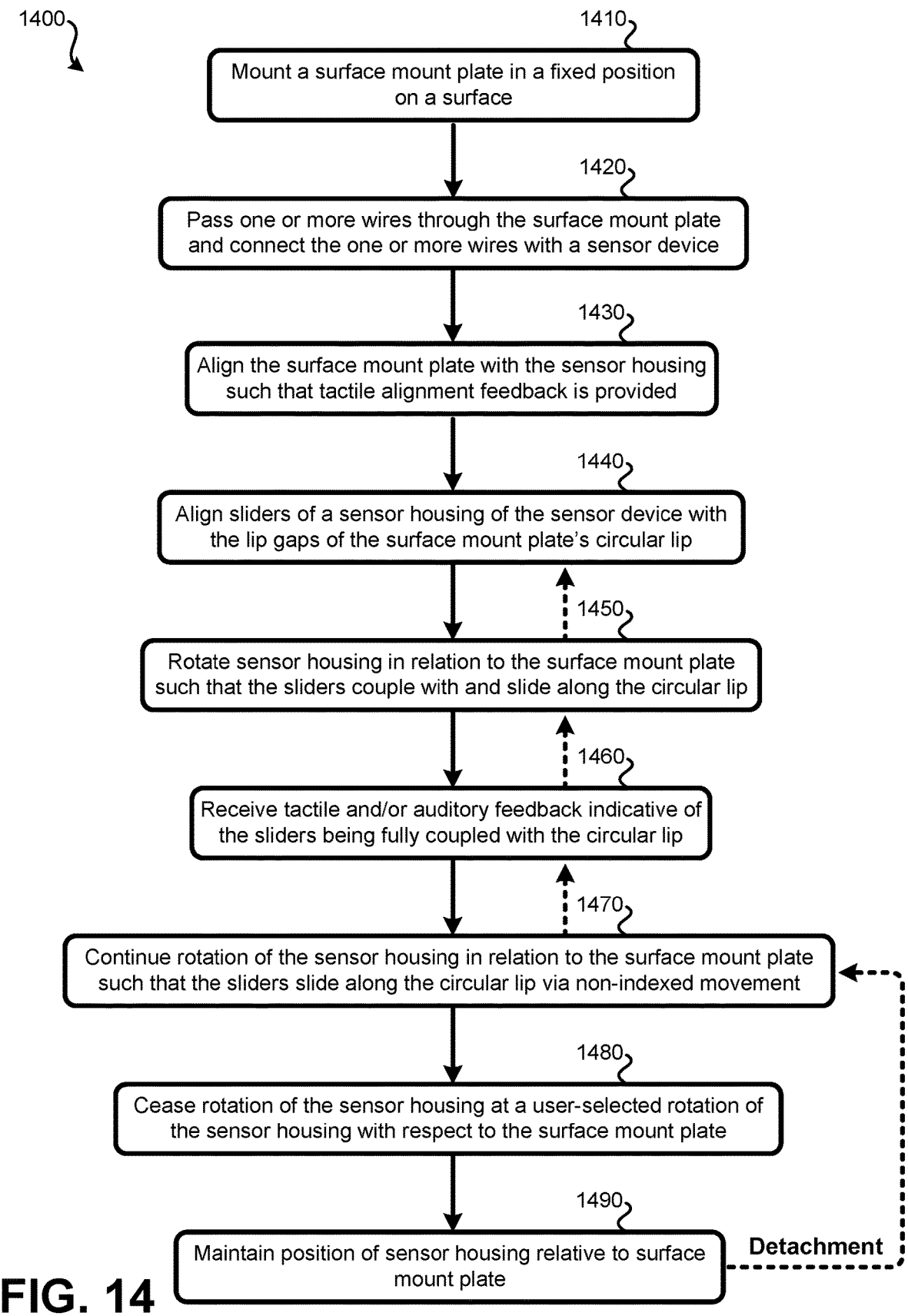
FIG. 14 illustrates a method for attaching and orienting a sensor housing with a surface mount plate.

FIG. 14 represents a method 1400 for attaching and orienting a sensor housing with a surface mount plate that involves the use of sliders, a circular lip, and lip gaps. While method 1400 focuses on the use of sensor housings, it should be understood that some other form of device housing can be mounted and oriented using the system and steps detailed in relation to method 1400. The steps of method 1400 may be performed using a surface mount system such as in the embodiments detailed in relation to FIGS. 3-6. As such, each step of method 1400 is either performed by or using a surface mount system, such as in the aforementioned figures.

At block 1410, a surface mount plate may be mounted in a fixed position on a surface. Typical locations include a wall or a ceiling. To mount the surface mount plate in the fixed position, fasteners, such as multiple screws and/or nails, may be attached to the surface through attachment points in the surface plate. The surface mount plate may be anchored in a fixed position on the surface using multiple screws, nails, and/or some other form of fastener. The fasteners should prevent movement and rotation of the surface mount plate. When the surface mount plate is mounted to the surface, it is detached from the sensor housing.

At block 1420, one or more wires may be passed through an opening in the surface mount plate. These wires may be connected with a connector of the sensor device. The wires, which may be in-wall or in-ceiling wires, may provide power to the sensor device and/or allow for communication between the sensor device and a remote device (e.g., another sensor device). Wires for other purposes may additionally or alternatively be present. In some embodiments, the center of the (circular) surface mount plate contains a circular opening to allow the wires to pass through the surface mount plate for connection with the sensor device.

At block 1430, sliders of the sensor housing may be aligned with a depressed circular edge of the surface mount plate. To perform such alignment, a user may move the sensor housing horizontally and vertically in relation to the surface mount plate until tactile feedback is received in the form of the sensor housing aligning with the depressed circular edge. The feedback may consist of the sensor housing moving slightly toward the surface mount plate and the sensor housing not easily being moved horizontally or vertically without the sensor housing being moved away from the surface mount plate. The feedback may include an auditory "click" or other sound indicative of the sliders moving into the depressed circular area of the surface mount plate. At block 1430, the sliders have not yet been aligned with distributed gaps of the surface mount plate. As such, a user is likely holding the sensor housing in place.

At block 1440, sliders of the sensor housing may be aligned with the distributed lip gaps of the surface mount plate's circular lip. Since longitudinal and latitudinal alignment has already occurred at block 1430, the sensor housing may be rotated either clockwise or counterclockwise until the sliders align with the distributed gaps. The user may receive tactile feedback to know when the sliders are aligned with the distributed gaps by applying slight pressure to the sensor housing towards the surface mount plate. When aligned, the sensor housing will move toward the surface mount plate due to the sliders entering the distributed lip gaps. This movement serves as feedback to the user to know when the sliders have been aligned with the distributed gaps.

At block 1450, the sensor housing is rotated by the user in relation to the surface mount plate. Since the sliders were inserted into the distributed gaps at block 1440, the rotation applied by the user causes the sliders to couple with and slide along the circular lip of the surface mount plate. In some embodiments, rotation may be performed by the user in either the clockwise or counterclockwise direction. In other embodiments, rotation may be performed by the user in only one direction, such as clockwise. In such embodiments, the circular lip of the surface mount plate may contain a protruding block to prevent sliders from attaching to the circular lip from one edge of where the circular lip meets the distributed gap.

At block 1460, while the rotation of block 1450 is occurring, tactile and/or auditory feedback may be received by the user from the surface mounting system. By virtue of one or more feedback protrusions in the circular lip, during rotation the user may feel a slight bump and/or hear a click. The feedback indicates that the sliders are fully coupled with the circular lip. The feedback protrusions may be encountered immediately or a short angular distance after the sliders have been slid onto the circular lip. While additional rotation of the sensor housing with respect to the surface mount plate is permitted, such rotation is at the discretion of the user; such further rotation does not affect the coupling between the surface mount plate and the sensor housing.

At block 1470, rotation may continue as the user continues to supply force to rotate the sensor housing in relation to the surface mount plate. Such rotation may cause the sliders, which are coupled with the circular lip, to slide along the circular lip. During such rotation, the sensor housing remains fully engaged with the surface mount plate. The rotation of block 1470 may be non-indexed. At block 1480, the user may cease rotating the sensor housing in relation to the surface mount plate at a desired, user-selected orientation. For instance, for a rectangular sensor device, it may be desired that an edge of the sensor housing be aligned (e.g., parallel, perpendicular, or at a designated angle, such as 45°) with a wall edge (i.e., where a wall meets another wall), ceiling edge (i.e., where the ceiling meets a wall), the floor, or with some object.

When rotation is ceased at block 1480, the position of the sensor housing relative to the surface mount plate may be maintained via friction at block 1490. The friction may be primarily generated by a compressible ring located between the surface mount plate and the sensor housing. In some embodiments, the compressible ring is permanently attached to the surface mount plate such that the compressible ring is compressed when the sensor housing is coupled with the surface mount plate. In some embodiments, the compressible ring is instead permanently attached to the sensor housing such that the compressible ring is compressed when the sensor housing is coupled with the surface mount plate. The friction generated between the compressible ring and either the sensor housing (if the compressible ring is permanently attached to the surface mount plate) or the surface mount plate (if the compressible ring is permanently attached to the sensor housing) may prevent the sensor housing from rotating in relation to the surface mount plate as long as a user is not applying rotational force to the sensor housing. The static friction generated by the compressible ring may be sufficient to counteract one or more non-user induced forces, including: linear and/or torsional force generated by the one or more wires that may have been attached to the sensor device at block 1420 (e.g., stiff and/or twisted wires), uneven weight distribution of components within the sensor device (e.g., if the sensor is wall-mounted and components left of center in the sensor device weigh more than the components right of center), and/or environmental vibration. The friction provided by the compressible ring may also have, at blocks 1450 and 1470, provided some amount of resistance via sliding friction. This sliding friction may provide the user with a user-friendly amount of resistance that allows the user to rotate the sensor housing without the sensor housing moving in response to incidental touches. Further, as previously detailed, the compressible ring may eliminate or significantly decrease airflow between the sensor housing and the surface mount plate.

Via the dotted arrows, FIG. 14 also shows an embodiment of a method for detaching the sensor housing from the surface mount plate. Such steps may be understood as a separate method for detaching the sensor housing or as part of a larger method that includes both attachment and detachment of the sensor housing with the surface mount plate.

For detachment, rotation is either continued in the same direction or reversed. In some embodiments, detachment requires that the sensor housing be rotated in a counterclockwise direction. In such embodiments, continued clockwise rotation is eventually blocked by a block present along the circular lip. Tactile and/or auditory feedback may again be provided at block 1460 by the one or more feedback protrusions—this time to indicate that the sensor housing has become or is about to become disengaged from the circular lip. Following such feedback, the sliders may enter the distributed gaps of the circular lip such that the distributed gaps are aligned with the sliders as at block 1440, thus causing the sliders to no longer be coupled with the circular lip. The sensor housing may then be moved away from the surface mount plate, which may involve the user pulling the sensor housing perpendicularly away from the surface mount plate or the user supporting the sensor housing as gravity moves the sensor housing away from the surface mount plate.

Figure 15:
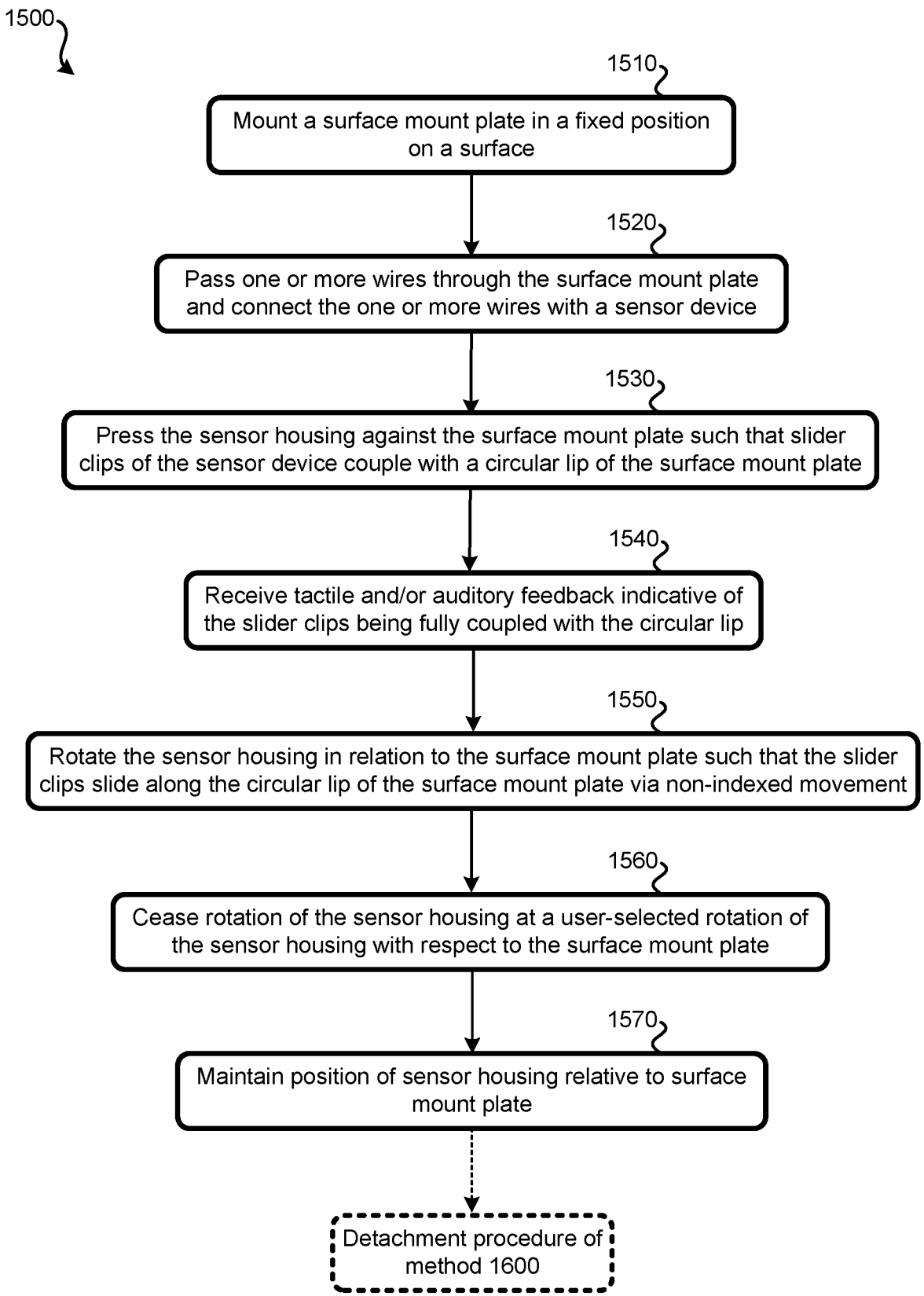
FIG. 15 illustrates a method for attaching a sensor housing to a surface mount plate.

FIG. 15 represents a method 1500 for attaching and orienting a sensor housing with a surface mount plate that involves a circular lip, protuberant nubs, and slider clips. While method 1500 focuses on the use of sensor housings, it should be understood that some other form of device housing can be mounted and oriented using the system and steps detailed in relation to method 1500. The steps of method 1500 may be performed using a surface mount system such as in the embodiments detailed in relation to FIGS. 7-13. As such, each step of method 1500 is either performed by or using a surface mount system, such as in the aforementioned figures.

At block 1510, a surface plate may be mounted in a fixed position on a surface. Typical locations include a wall or ceiling. To mount the surface plate in the fixed position, fasteners, such as screws or nails, may be attached to the surface through attachment points in the surface plate. Therefore, the surface plate may be anchored in a fixed position on the surface using multiple screws, nails, and/or some other form of fastener. When the surface plate is mounted to the surface, it is detached from the sensor housing.

At block 1520, one or more wires may be passed through an opening in the surface mount plate. These wires may be connected with a connector of the sensor device. The wires, which may be in-wall or in-ceiling wires, may provide power to the sensor device and/or allow for communication between the sensor device and a remote device (e.g., another sensor device). In some embodiments, the center of the (circular) surface mount plate contains a circular opening to allow the wires to pass through the surface mount plate for connection with the sensor device.

At block 1530, the sensor housing may be aligned and pressed against the surface mount plate such that slider clips of the sensor device couple with a circular lip of the surface mount plate. When the slider clips are aligned and pressed against the exterior edge of the circular lip, the lip and the pressure being applied by the installer may cause the slider clips to actuate (e.g., flex). When sufficient pressure is applied to the sensor housing, the slider clips may actuate and couple with the circular lip. It should be understood that while the detailed embodiment has the circular lip located on the surface mount plate and the slider clips located on the sensor housing, in other embodiments, the circular lip may be located on the sensor housing and the slider clips may be located on the surface mount plate.

The actions of block 1530 may result in auditory and/or tactile feedback being generated by the surface mount system and being received by the user, such as in the form of an auditory "click," at block 1540. This feedback may signal to the installer that the sensor housing is fully engaged with the surface mount plate. At this point, it should be noted that the sensor housing is fully engaged, meaning that any rotation of the sensor housing with respect to the surface mount plate (with the exception of the interaction with the protuberant nubs discussed in relation to method 800) does not affect the coupling between the sensor housing and the surface mount plate. Rather, such rotation may be for visual alignment with other objects in the room (e.g., a ceiling or wall edge, alignment with the ground).

At block 1550, the installer may rotate the sensor housing in relation to the surface mount plate. Such rotation may cause the slider clips, which are coupled with the circular lip, to slide along the circular lip. During such rotation, the sensor housing remains fully engaged with the surface mount plate. It may be possible to rotate the sensor housing either clockwise or counterclockwise. The rotation of block 1550 may be non-indexed. At block 1560, the installer may cease rotating the sensor housing in relation to the surface mount plate at a desired, user-selected rotation. For instance, for a rectangular sensor device, it may be desired that an edge of the sensor housing be aligned (e.g., parallel, perpendicular, or at a designated angle, such as 45°) with a wall edge (i.e., where a wall meets another wall), ceiling edge (i.e., where the ceiling meets a wall), the floor, or with some object.

When rotation is ceased at block 1560, the position of the sensor housing relative to the surface mount plate may be maintained via friction. The friction may be primarily generated by a compressible ring located between the surface mount plate and the sensor housing. In some embodiments, the compressible ring is permanently attached to the surface mount plate such that the compressible ring is compressed when the sensor housing is coupled with the surface mount plate. In some embodiments, the compressible ring is instead permanently attached to the sensor housing such that the compressible ring is compressed when the sensor housing is coupled with the surface mount plate. The compressible ring may be made of foam. The friction generated between the compressible ring and either the sensor housing (if the compressible ring is permanently attached to the surface mount plate) or the surface mount plate (if the compressible ring is permanently attached to the sensor housing) may prevent the sensor housing from rotating in relation to the surface mount plate without an installer providing force for such rotation. The static friction generated by the compressible ring may be sufficient to counteract one or more forces, include: linear and/or torsional force generated by the one or more wires that may have been attached to the sensor device at block 1520, uneven weight distribution of components within the sensor device (e.g., if the sensor is wall-mounted and components left of center in the sensor device weigh more than the components right of center), and/or environmental vibration. The friction provided by the compressible ring may also have, at block 1550, provided some amount of resistance via sliding friction. This sliding friction may provide the installer with a user-friendly amount of resistance that allows the user to rotate the sensor housing without the sensor housing moving in response to incidental touches. Further, as previously detailed, the compressible ring may eliminate or significantly decrease airflow between the sensor housing and the surface mount plate.

Following block 1570, the sensor housing may remain in its position relative to the surface mount plate until again manipulated by a user. For instance, in the case of a carbon monoxide detector and/or smoke detector, the sensor housing may remain so positioned for many days, weeks, months, or even years until a user needs to change the batteries of sensor or otherwise fully or partially uninstall the sensor device. When detachment of the sensor housing from the surface mount plate is needed, method 800 may be used.

Figure 16:
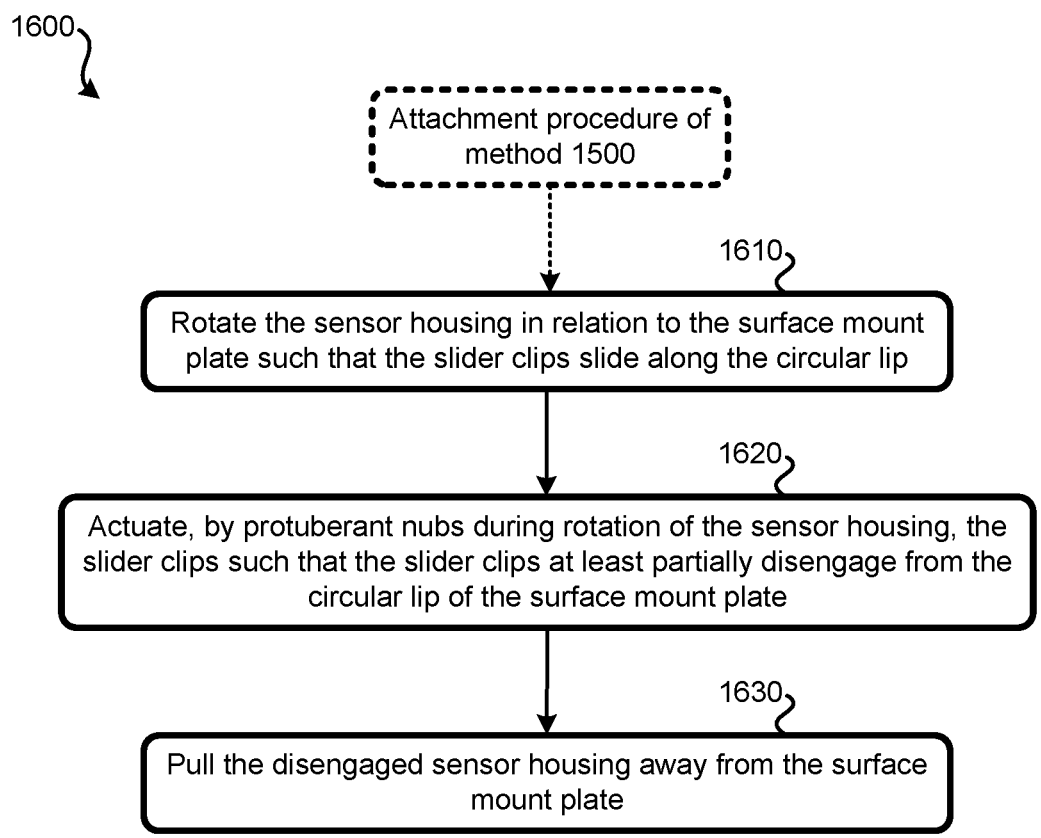
FIG. 16 illustrates a method for detaching a sensor housing from a surface mount plate.

FIG. 16 represents a method 1600 for attaching and orienting a sensor housing with a surface mount plate. While method 1600 focuses on the use of sensor housings, it should be understood that some other form of device housing can be mounted and oriented using the system and steps detailed in relation to method 1600. The steps of method 1600 may be performed using a surface mount system such as in the embodiments detailed in relation to FIGS. 7-13. As such, each step of method 1600 is either performed by or using a surface mount system, such as in the aforementioned figures. Method 1600 may be performed to remove a sensor housing that was previously coupled with a surface mount plate via method 1500 of FIG. 15.

At block 1610, the sensor housing is rotated (e.g., by a user) in relation to the surface mount plate such that the slider clips slide along the circular lip of the surface mount plate (alternatively, the location of the circular lip and the slider clips can be reversed). The sensor housing may be rotated clockwise or counterclockwise. Sufficient force may be applied by a user to overcome the friction caused by a compressible ring located between sensor housing and the surface mount plate.

At block 1620, the rotation of block 1610 will cause protuberant nubs located along the circular lip to contact with and engage the slider clips. Such actuation of the slider clips will either fully or partially disengage all of the slider clips from the circular lip (e.g., by pushing the slider clips away from the circular lip). Therefore, the rotational force applied by the user is translated by the protuberant nubs into a force disengaging all of the slider clips from the circular lip. When the protuberant nubs actuate the slider clips, the user may cease rotating the sensor housing (assuming the user desires to remove the sensor housing from the surface mount plate).

While the protuberant nubs are actuating the slider clips such that the slider clips are partially or fully disengaged from the circular lip, the user may pull the disengaged sensor housing away from the surface mount plate at block 1630. If the surface mount plate is mounted to a ceiling, gravity may supply some or all of the force necessary to separate the disengaged sensor housing from the surface mount plate. Notably, while the sensor housing was engaged with the surface mount plate via a user pushing the sensor housing against the surface mount plate, disengaging the sensor housing from the surface mount plate is accomplished by a user providing rotational force to the sensor housing. If desired, any wires connected with the rear of the sensor housing can be uncoupled. If recoupling between the sensor housing and the surface mount plate is desired, method 1500 may be used.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A surface mount system for a device, the surface mount system comprising:
    a surface mount plate, comprising:
        a plate defining a plurality of attachment mounting points that allow a plurality of fasteners to secure the surface mount plate to a surface such that the surface mount plate is mounted in a fixed position in relation to the surface;
        a continuous circular lip extending around a perimeter of the plate; and
        a plurality of nubs located along the continuous circular lip extending around the perimeter of the surface mount plate; and
    a device housing, comprising:
        a plurality of slider clips that removably clip to the continuous circular lip of the surface mount plate wherein:
            the plurality of slider clips actuate outwardly when the continuous circular lip of the surface mount plate is pushed against the device housing then the plurality of slider clips return inwardly to clip with the continuous circular lip;
            the plurality of slider clips slide along the continuous circular lip to allow the device housing to be rotated in relation to the surface mount plate while the device housing remains coupled with the surface mount plate; and
            the plurality of slider clips disengage from the continuous circular lip of the surface mount plate when the device housing is rotated with respect to the surface mount plate such that the plurality of nubs located on the plate push the plurality of slider clips away from the continuous circular lip.

2. The surface mount system for the device of claim 1, wherein the surface mount plate further comprises a seal that comprises a compressible ring.

3. The surface mount system for the device of claim 2, wherein the seal encircles the plurality of attachment mounting points defined by the surface mount plate.

4. The surface mount system for the device of claim 3, wherein the seal and the device housing, when the device housing is attached with the surface mount plate, prevents air from passing through the plurality of attachment mounting points into an environment of a sensor within the device housing.

5. The surface mount system for the device of claim 4, wherein the sensor within the device housing is a smoke sensor.

6. The surface mount system for the device of claim 4, wherein the sensor within the device housing is a carbon monoxide sensor.

7. The surface mount system for the device of claim 1, wherein the device housing further comprises a circular depressed lip along which the plurality of slider clips are located.

8. The surface mount system for the device of claim 1, wherein the surface mount plate is circular and the device housing is rectangular.

9. The surface mount system for the device of claim 1, wherein the plurality of nubs are distributed such that a nub is present every 90 degrees.

10. The surface mount system for the device of claim 1, the surface mount plate further defines a wire pass-through that is larger than each of the plurality of attachment mounting points.

11. A method for using a surface mount system to align a device, the method comprising:
    mounting a surface mount plate in a fixed position on a surface using a plurality of fasteners mounted through a plurality of attachment mounting points of the surface mount plate, wherein the surface mount plate comprises:
        a continuous circular lip extending around a perimeter of the surface mount plate; and
        a plurality of nubs located along the continuous circular lip extending around the perimeter of the surface mount plate; and
    pressing a device housing against the surface mount plate, wherein:
        a plurality of slider clips of the device housing actuate outwardly when the continuous circular lip of the surface mount plate is pushed against the device housing then the plurality of slider clips return inwardly to clip with the continuous circular lip;
        the plurality of slider clips slide along the continuous circular lip to allow the device housing to be rotated in relation to the surface mount plate while the device housing remains coupled with the surface mount plate; and
        the plurality of slider clips disengage from the continuous circular lip of the surface mount plate when the device housing is rotated with respect to the surface mount plate such that the plurality of nubs located on the surface mount plate push the plurality of slider clips away from the continuous circular lip; and
    after the plurality of slider clips have coupled with the continuous circular lip, rotating the device housing in relation to the surface mount plate such that the plurality of slider clips slide along the continuous circular lip of the surface mount plate.

12. The method for using the surface mount system to align the device of claim 11, further comprising:
    rotating the device housing in relation to the surface mount plate such that the plurality of slider clips align with the plurality of nubs; and
    actuating, by the plurality of nubs, the plurality of slider clips such that the plurality of slider clips disengage from the continuous circular lip of the surface mount plate.

13. The method for using the surface mount system to align the device of claim 12, further comprising:
    moving the device housing away from the surface mount plate while the plurality of slider clips are disengaged from the continuous circular lip of the surface mount plate.

14. The method for using the surface mount system to align the device of claim 11, further comprising:
    ceasing rotation of the device housing while the plurality of slider clips are sliding along the continuous circular lip of the surface mount plate at a position such that an edge of the device housing is parallel to an edge of an external object distinct from the device housing; and
    maintaining the position of the device housing relative to the surface mount plate following rotation of the device housing being ceased.

15. The method for using the surface mount system to align the device of claim 11, further comprising: compressing a compressible ring between the device housing and the surface mount plate when the device housing is pressed against the surface mount plate.

16. The method for using the surface mount system to align the device of claim 11, wherein the device housing houses a smoke sensor, a carbon monoxide sensor, or both.

17. The method for using the surface mount system to align the device of claim 11, wherein rotating the device housing in relation to the surface mount plate comprises rotating the device housing using non-indexed motion.

18. The method for using the surface mount system to align the device of claim 11, further comprising: creating tactile feedback indicative of the plurality of slider clips coupling with the continuous circular lip.

19. The method for using the surface mount system to align the device of claim 11, further comprising: creating auditory feedback indicative of the plurality of slider clips coupling with the continuous circular lip.

20. The method for using the surface mount system to align the device of claim 11, further comprising:
    prior to pressing the device housing against the surface mount plate, passing one or more wires through the surface mount plate and connecting the one or more wires with the device housing.

* * * * *